US011036218B2

(12) United States Patent
Tahara

(10) Patent No.: US 11,036,218 B2
(45) Date of Patent: Jun. 15, 2021

(54) INTERACTION APPARATUS, INTERACTION METHOD, RECORDING MEDIUM STORING INTERACTION PROGRAM, AND ROBOT

(71) Applicant: Panasonic Intellectual Property Management Co., Ltd., Osaka (JP)

(72) Inventor: Kohei Tahara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 229 days.

(21) Appl. No.: 16/170,011

(22) Filed: Oct. 24, 2018

(65) Prior Publication Data

US 2019/0212728 A1 Jul. 11, 2019

(30) Foreign Application Priority Data

Jan. 10, 2018 (JP) ............................ JP2018-001815

(51) Int. Cl.
*G05D 1/00* (2006.01)
*G05D 1/02* (2020.01)
(Continued)

(52) U.S. Cl.
CPC ............ *G05D 1/0033* (2013.01); *A63F 9/24* (2013.01); *A63H 3/28* (2013.01); *A63H 11/00* (2013.01);
(Continued)

(58) Field of Classification Search
None
See application file for complete search history.

(56) References Cited

U.S. PATENT DOCUMENTS

2006/0279630 A1* 12/2006 Aggarwal ............... G06T 7/246 348/143
2011/0098103 A1* 4/2011 Munakata ............... G07F 17/32 463/22
2013/0014055 A1* 1/2013 Song ...................... G09B 19/00 715/810

FOREIGN PATENT DOCUMENTS

JP 2011-150633 8/2011

OTHER PUBLICATIONS

J. Gregory Trafton, Children and robots learning to play hide and seek (Year: 2006).*

(Continued)

*Primary Examiner* — Bao Long T Nguyen
*Assistant Examiner* — Bakari Underwood
(74) *Attorney, Agent, or Firm* — Greenblum & Bernstein, P.L.C.

(57) ABSTRACT

An apparatus includes a movement mechanism, a sensor, a microphone, a speaker, a processor and a memory. The processor selects a target region, controls the movement mechanism to cause the apparatus to move to the target region, and causes a speaker to output a first sound. When counting a predetermined number, the processor causes the sensor to trace a movement locus of a user. In a case where the processor has determined that an acquired sound contains a predetermined speech, the processor controls the movement mechanism to cause the apparatus to move through a predetermined space. When the processor has determined that the apparatus is not to intentionally lose in a game of hide-and-seek, the processor controls the movement mechanism to cause the apparatus to move to a target blind spot within the predetermined space, and causes the speaker to output a second sound.

13 Claims, 15 Drawing Sheets

(51) Int. Cl.

| | |
|---|---|
| ***G06F 3/16*** | (2006.01) |
| ***A63H 13/00*** | (2006.01) |
| ***A63H 11/00*** | (2006.01) |
| ***B25J 11/00*** | (2006.01) |
| ***A63H 33/00*** | (2006.01) |
| ***A63F 9/24*** | (2006.01) |
| ***A63H 3/28*** | (2006.01) |

(52) U.S. Cl.

CPC ......... *A63H 13/005* (2013.01); *A63H 33/005* (2013.01); *B25J 11/0005* (2013.01); *G05D 1/0088* (2013.01); *G05D 1/0246* (2013.01); *G05D 1/0274* (2013.01); *G06F 3/167* (2013.01); *A63F 2009/2432* (2013.01); *A63F 2009/2435* (2013.01); *A63F 2009/2442* (2013.01); *A63F 2009/2476* (2013.01); *A63H 2200/00* (2013.01); *G05D 2201/0214* (2013.01); *G05D 2201/0217* (2013.01)

(56) References Cited

OTHER PUBLICATIONS

"Robot Playing Hide and Seek" by Navy Center for Applied Research in Artificial Intelligence, https://www.youtube.com/watch?v=SQS0hcCgluc (Year: 2013).*

* cited by examiner

| OBJECT ID | POSITION RANGE | OBJECT CLASS |
|---|---|---|
| 1 | {· · ·} | ROOM |
| 2 | {· · ·} | TABLE |
| 3 | {· · ·} | SOFA |
| 4 | {· · ·} | DOOR |
| 5 | {· · ·} | CURTAIN |
| 6 | {· · ·} | TELEVISION |
| 7 | {· · ·} | CHAIR |
| ··· | ··· | ··· |

| BLIND SPOT TARGET OBJECT |
|---|
| SOFA |
| CURTAIN |
| FUTON |
| BLANKET |
| CLOSET |
| ··· |

| BLIND-SPOT REGION ID (401) | POSITION RANGE (402) | REGION CLASS (403) | BLIND SPOT TARGET (404) |
|---|---|---|---|
| 1 | {· · ·} | ROOM | NO |
| 2 | {· · ·} | TABLE | NO |
| 3 | {· · ·} | SOFA | YES |
| 4 | {· · ·} | DOOR | NO |
| 5 | {· · ·} | CURTAIN | YES |
| 6 | {· · ·} | TELEVISION | NO |
| 7 | {· · ·} | CHAIR | NO |
| 8 | {· · ·} | CLOSET | YES |
| ... | ... | ... | ... |

| NUMBER-OF-BLIND-SPOTS REGION ID (801) | POSITION RANGE (802) | NUMBER OF BLIND SPOTS (803) | BLIND-SPOT REGION ID (804) |
|---|---|---|---|
| REGION 701 | {· · ·} | 0 | |
| REGION 702 | {· · ·} | 1 | REGION 8 |
| REGION 703 | {· · ·} | 0 | |
| REGION 704 | {· · ·} | 1 | REGION 5 |
| REGION 705 | {· · ·} | 0 | |
| REGION 706 | {· · ·} | 1 | REGION 5 |
| REGION 707 | {· · ·} | 2 | REGION 5, REGION 8 |
| REGION 708 | {· · ·} | 2 | REGION 3 |

FIG. 11

| TEXT ID (901) | TEXT (902) | ACTION CONTENT (903) |
|---|---|---|
| 1 | GOOD MORNING | MORNING GREETING |
| 2 | I'M OFF! | SEND-OFF |
| 3 | I'M BACK | WELCOME BACK |
| 4 | LET'S PLAY | PRESENTATION OF PLAY |
| 5 | LET'S PLAY HIDE-AND-SEEK | START OF HIDE-AND-SEEK |
| 6 | I'M READY | START SEEKING IN HIDE-AND-SEEK |
| 7 | NOT YET | POSTPONEMENT OF START OF SEEKING IN HIDE-AND-SEEK |
| ... | ... | ... |

| SPEECH ID | SPEECH TEXT |
|---|---|
| 1 | · OK, THERE WE GO.<br>· LET'S PLAY HIDE-AND-SEEK.<br>. . . |
| 2 | · LET'S START HIDE-AND-SEEK. ARE YOU READY? GET STARTED!<br>· OK, HIDE. ARE YOU READY? GET STARTED!<br>. . . |
| 3 | · READY OR NOT?<br>· HAVE YOU FINISHED HIDING?<br>. . . |
| 4 | · OK, HERE I COME.<br>· WHERE ARE YOU HIDING?<br>. . . |
| 5 | · I'VE FOUND YOU.<br>· I'VE FOUND YOU, XX.<br>. . . |
| 6 | · I'VE WON.<br>· I'VE GOT YOU.<br>. . . |
| 7 | · I RESIGN.<br>· YOU'VE WON, XX.<br>. . . |

FIG. 19
1701 1702
| FACIAL EXPRESSION ID | FACIAL EXPRESSION PATTERN |
|---|---|
| 1 | 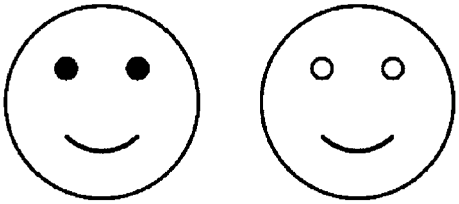 ... |
| 2 | 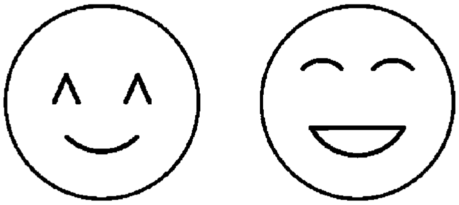 ... |
| 3 | 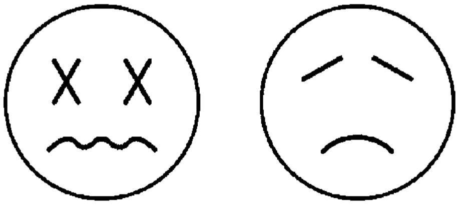 ... |
| 4 | 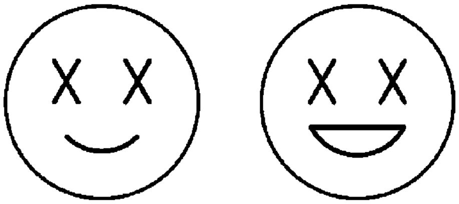 ... |

INTERACTION APPARATUS, INTERACTION METHOD, RECORDING MEDIUM STORING INTERACTION PROGRAM, AND ROBOT

BACKGROUND

1. Technical Field

The present disclosure relates to an apparatus, a method, a recording medium storing a program, and a robot for interacting with a user while two-dimensionally moving through a predetermined space.

2. Description of the Related Art

There is a variety of conceivable situations in which a robot and a human, particularly a young child, have communication with each other. Examples of conceivable situations include a situation where the robot and the young child have a conversation with each other using language, a situation where the robot questions the young child and the young child answers, a situation where the robot and the young child assume their respective roles and play a game that entails actions, and similar situations.

In a case where the robot and the young child play a game such as hide-and-seek or tag, the robot needs to have a capability of winning a victory over the young child. As an example, in the case of hide-and-seek where the robot assumes the role of a seeker and the young child assumes the role of a hider, the young child can hide in a room of a house where there are a large number of places that become the robot's blind spots. Examples of places that become the robot's blind spots in which the young child can hide include a space between a door that is open and a wall, a space that is formed by the young child wrapping him/herself in a curtain, a space that is formed by the young child wrapping him/herself in a blanket on a sofa, and similar spaces.

In order to find the young child hiding in such a space that becomes a blind spot, the robot needs to recognize, as a blind spot, the space in which the young child is hiding and narrow down to the space in which the young child is hiding. For example, Japanese Patent No. 5407898 discloses a technology for checking how a blind spot exists in a space.

SUMMARY

However, the conventional technology has needed further improvement, as it has difficulty in identifying the position of a blind spot in which a user is hiding, although it can identify the position of a blind spot in a space.

One non-limiting and exemplary embodiment provides an apparatus, a method, a recording medium storing a program, and a robot that make it possible to identify a blind spot in which a user is highly likely to be hiding and that cannot be seen from the apparatus.

In one general aspect, the techniques disclosed here feature an apparatus for interacting with a user while two-dimensionally moving through a predetermined space, including: a movement mechanism; a sensor that detects an electromagnetic wave or sound wave reflected by an object; a microphone that acquires a sound of an area around the apparatus; a speaker; a processor; and a memory, wherein in a case where the processor has determined that the sound thus acquired contains a first speech to an effect that the user starts hide-and-seek with the apparatus, the processor selects, with reference to a first table stored in the memory, a first region where the number of blind spots is smallest in the space, the first table associating a plurality of regions included in the space and the numbers of blind spots in the plurality of regions with each other, the processor controls the movement mechanism to cause the apparatus to move to the first region, the processor causes the speaker to output a first sound, the processor counts a predetermined number, when counting the predetermined number, the processor causes the sensor to trace a movement locus of the user, in a case where the processor has finished counting the predetermined number, the processor causes the speaker to output a sound indicating that the processor has finished counting the predetermined number, in a case where the processor has determined that the sound thus acquired contains a second speech indicating that the user has finished hiding, the processor controls the movement mechanism to cause the apparatus to move through an entire region in the space through which the apparatus is able to move, in a case where the sensor has not detected the user by a time the apparatus finishes moving through the entire region, the processor selects, with reference to a second table stored in the memory, a first blind spot falling within a predetermined range from an end of the movement locus, the second table associating a blind spot in the space and a position of the blind spot with each other, the processor determines whether the apparatus intentionally loses in hide-and-seek, in a case where the processor has determined that the apparatus does not intentionally lose, the processor controls the movement mechanism to cause the apparatus to move to the first blind spot, the processor causes the speaker to output a second sound, in a case where the processor has determined that the sound thus acquired contains a third speech indicating an admission of defeat in hide-and-seek by the user, the processor causes the speaker to output a third sound, and in a case where the processor has determined that the sound thus acquired does not contain the third speech, the processor causes the speaker to output a fourth sound.

These general and specific aspects may be implemented using a computer program, and any combination of systems, methods, and computer programs.

The present disclosure makes it possible to identify a blind spot in which the user is highly likely to be hiding and that cannot be seen from the apparatus.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a diagram showing an example of an object position information table according to the present embodiment;

FIG. 6 is a diagram showing an example of a blind spot target object table according to the present embodiment;

FIG. 11 is a diagram showing an example of an intention interpretation table according to the present embodiment;

FIG. 18 is a diagram showing examples of speech text patterns that are outputted from a speaker according to the present embodiment; and FIG. 19 is a diagram showing examples of expression patterns that are displayed on a display according to the present embodiment.

DETAILED DESCRIPTION

Underlying Knowledge Forming Basis of the Present Disclosure

In a case where a robot including a movement mechanism and a human, particularly a young child under 6, have communication with each other, it is conceivable that they may play a variety of games. Examples of games include a game in which the robot finds the young child hiding somewhere in a house. At a game starting sign from the young child, the game is started between the young child and the robot. The young child hides in a place in a room of the house where it is hard to find him/her. After a designated period of time such as 30 seconds or 1 minute has elapsed, the robot starts to seek for the hiding young child. In a case where the robot has successfully found the young child by identifying the place in which the young child is hiding, the robot is a winner. Further, in a case where the robot has failed to identify the place in which the young child is hiding or a case where the robot has erroneously identified the place in which the young child is hiding, the hiding young child is a winner.

Figure 1:
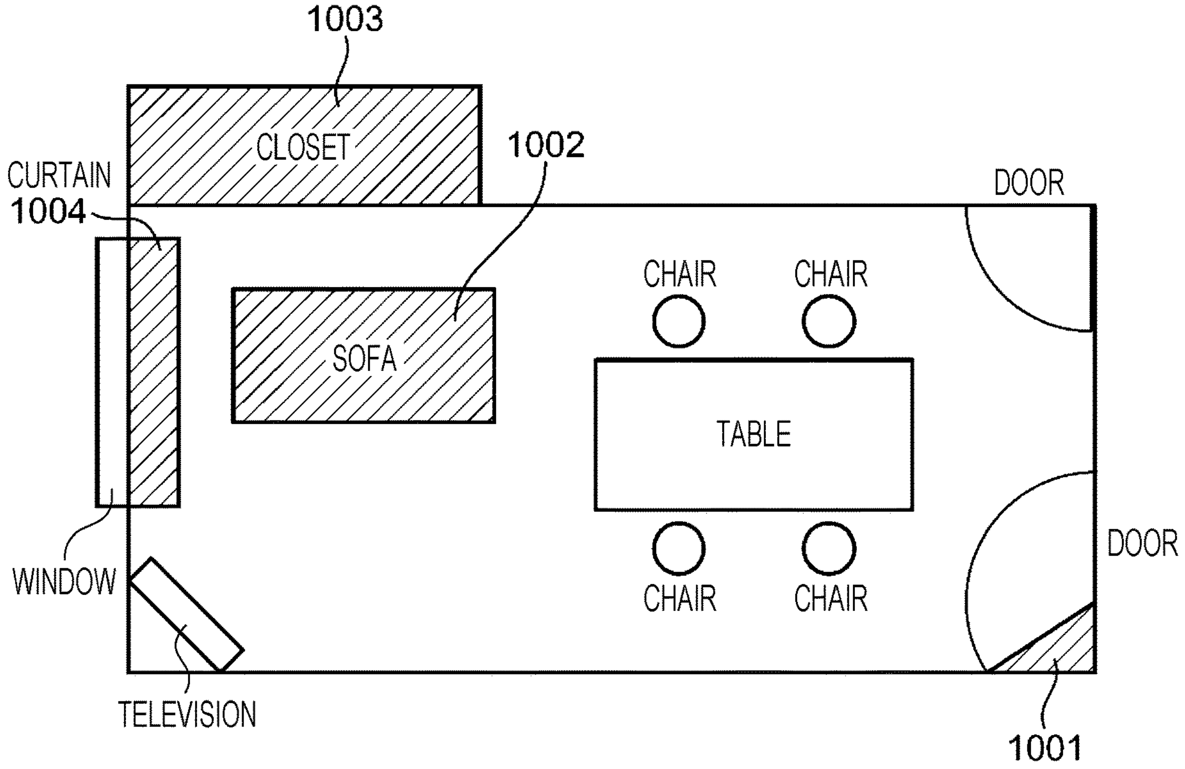
FIG. 1 is a diagram showing an example of a layout of a room where a robot and a young child play a game.

FIG. 1 is a diagram showing an example of a layout of a room where the robot and the young child play a game. In a case where the game is played more than once, it is conceivable that the robot may 100% lose to the young child. As illustrated in FIG. 1, a room of a house has places that make the young child's body invisible from the robot's sight, such as a gap 1001 that is formed between a door that is open and a wall, a sofa 1002 on which the young child can hide by covering him/herself with a blanket, a closet 1003 in which the young child can hide by closing its door, and a curtain 1004 behind which the young child can hide by changing its shape.

In order to win in a case where the young child hides in such a place that becomes the robot's blind spot, the robot needs to grasp in advance blind-spot regions that do not come into sight even when the robot seeks in the room for the young child. A blind spot in the room can be identified by using the technology of Japanese Patent No. 5407898.

However, even if the robot can identify, using the technology of Japanese Patent No. 5407898, a plurality of blind-spot regions in the room that become blind spots when seen from the present position, it is difficult to narrow down which of the plurality of blind-spot regions the young child is hiding in. Even if the robot includes a movement mechanism and is able to move through every place in the room excluding obstacles, the robot needs to include a door opening and closing mechanism, a curtain opening and closing mechanism, or a blanket pulling mechanism in order to identify, from among such a space formed between the door that is open and the wall, such a space formed by the young child wrapping him/herself in the curtain, and such a space formed by the young child wrapping him/herself in the blanket on the sofa, the space in which the young child is hiding.

However, a robot not including a door opening and closing mechanism, a curtain opening and closing mechanism, or a blanket pulling mechanism is undesirably unable to reach the space formed between the door that is open and the wall, the space formed by the young child wrapping him/herself in the curtain, and the space formed by the young child wrapping him/herself in the blanket on the sofa.

Further, in a case where a plurality of blind-spot regions are present at the start of the game, the blind spot in which the young child cannot be identified from among the plurality of blind spots. Although the robot can randomly select one blind spot from among the plurality of blind spots, the young child may not be hiding in the blind spot randomly selected, and a technology for identifying, from among the plurality of blind spots, the blind spot in which the young child is hiding has not been heretofore studied.

In one general aspect, the techniques disclosed here feature an apparatus for interacting with a user while two-dimensionally moving through a predetermined space, including: a movement mechanism; a sensor that detects an electromagnetic wave or sound wave reflected by an object; a microphone that acquires a sound of an area around the apparatus; a speaker; a processor; and a memory, wherein in a case where the processor has determined that the sound thus acquired contains a first speech to an effect that the user starts hide-and-seek with the apparatus, the processor selects, with reference to a first table stored in the memory, a first region where the number of blind spots is smallest in the space, the first table associating a plurality of regions included in the space and the numbers of blind spots in the plurality of regions with each other, the processor controls the movement mechanism to cause the apparatus to move to the first region, the processor causes the speaker to output a first sound, the processor counts a predetermined number, when counting the predetermined number, the processor causes the sensor to trace a movement locus of the user, in a case where the processor has finished counting the predetermined number, the processor causes the speaker to output a sound indicating that the processor has finished counting the predetermined number, in a case where the processor has determined that the sound thus acquired contains a second speech indicating that the user has finished hiding, the processor controls the movement mechanism to cause the apparatus to move through an entire region in the space through which the apparatus is able to move, in a case where the sensor has not detected the user by a time the apparatus finishes moving through the entire region, the processor selects, with reference to a second table stored in the memory, a first blind spot falling within a predetermined range from an end of the movement locus, the second table associating a blind spot in the space and a position of the blind spot with each other, the processor determines whether the apparatus intentionally loses in hide-and-seek, in a case where the processor has determined that the apparatus does not intentionally lose, the processor controls the movement mechanism to cause the apparatus to move to the first blind spot, the processor causes the speaker to output a second sound, in a case where the processor has determined that the sound thus acquired contains a third speech indicating an admission of defeat in hide-and-seek by the user, the processor causes the speaker to output a third sound, and in a case where the processor has determined that the sound thus acquired does not contain the third speech, the processor causes the speaker to output a fourth sound.

According to this configuration, in a case where the processor has determined that the sound thus acquired contains a first speech to the effect that the user starts hide-and-seek with the apparatus, the processor selects, with reference to a first table stored in the memory, a first region where the number of blind spots is smallest in the space. The first table associates a plurality of regions included in the space and the numbers of blind spots in the plurality of regions with each other. The processor controls the movement mechanism to cause the apparatus to move to the first region. The processor causes the speaker to output a first sound. The processor counts a predetermined number. When counting the predetermined number, the processor causes the sensor to trace a movement locus of the user. In a case where the processor has finished counting the predetermined number, the processor causes the speaker to output a sound indicating that the processor has finished counting the predetermined number. In a case where the processor has determined that the sound thus acquired contains a second speech indicating that the user has finished hiding, the processor controls the movement mechanism to cause the apparatus to move through an entire region in the space through which the apparatus is able to move. In a case where the sensor has not detected the user by the time the apparatus finishes moving through the entire region, the processor selects, with reference to a second table stored in the memory, a first blind spot falling within a predetermined range from an end of the movement locus. The second table associates a blind spot in the space and a position of the blind spot with each other. The processor determines whether the apparatus intentionally loses in hide-and-seek. In a case where the processor has determined that the apparatus does not intentionally lose, the processor controls the movement mechanism to cause the apparatus to move to the first blind spot. The processor causes the speaker to output a second sound. In a case where the processor has determined that the sound thus acquired contains a third speech indicating an admission of defeat in hide-and-seek by the user, the processor causes the speaker to output a third sound. In a case where the processor has determined that the sound thus acquired does not contain the third speech, the processor causes the speaker to output a fourth sound.

Accordingly, after the movement locus of the user has been traced by the sensor when the predetermined number has been counted and the user is hiding in the first region where the number of blind spots is smallest in the space, a movement to the entire region through which the apparatus is able to move is started, and in a case where the sensor has not detected the user by the time the apparatus finishes moving through the entire region, the first blind spot falling within the predetermined range from the end of the movement locus of the user is selected and the apparatus is moved to the first blind spot. Note here that the first blind spot can be said to be a blind spot in which the user is highly likely to have hidden, as the first blind spot falls within the predetermined range from the end of the movement locus of the user. This makes it possible to identify a blind spot in which the user is highly likely to be hiding and that cannot been seen from the apparatus.

Further, the apparatus may be configured such that in a case where the processor has determined that the apparatus intentionally loses, the processor selects, with reference to the second table, a second blind spot falling outside the predetermined range, the processor controls the movement mechanism to cause the apparatus to move to the second blind spot, the processor causes the speaker to output the second sound, in a case where the processor has determined that the sound thus acquired contains the third speech, the processor causes the speaker to output the third sound, and in a case where the processor has determined that the sound thus acquired does not contain the third speech, the processor causes the speaker to output the fourth sound.

According to this configuration, in a case where the processor has determined that the apparatus intentionally loses, the processor selects, with reference to the second table, a second blind spot falling outside the predetermined range. The processor controls the movement mechanism to cause the apparatus to move to the second blind spot, and the processor causes the speaker to output the second sound. In a case where the processor has determined that the sound thus acquired contains the third speech, the processor causes the speaker to output the third sound. In a case where the processor has determined that the sound thus acquired does not contain the third speech, the processor causes the speaker to output the fourth sound.

Accordingly, in a case where the processor has determined that the apparatus intentionally loses, the processor selects the second blind spot falling outside the end of the movement locus of the user. This makes it possible to prevent the apparatus from always keeping winning a victory over the user in hide-and-seek.

Further, the apparatus may be configured such that the sensor includes at least one of a camera, an infrared sensor, an ultrasonic sensor, and a laser sensor.

According to this configuration, the sensor includes at least one of a camera, an infrared sensor, an ultrasonic sensor, and a laser sensor. This makes it possible to accurately recognize the position of an object that constitutes a blind spot in the predetermined space.

Further, the apparatus may be configured such that in a case where the processor has determined that the sound thus acquired does not contain the third speech and where the sensor has detected the user hiding in a third blind spot that is not included in the second table, the processor stores the third blind spot and a position of the third blind spot in the second table in association with each other.

According to this configuration, in a case where the processor has determined that the sound thus acquired does not contain the third speech and where the sensor has detected the user hiding in a third blind spot that is not included in the second table, the processor stores the third blind spot and a position of the third blind spot in the second table in association with each other.

Accordingly, in a case where a position in which the user was hiding has not been stored in the second table, the third blind spot in which the user was hiding and the position of the third blind spot are stored in the second table in association with each other. This makes it possible to improve the precision with which to identify the blind spot in which the user is hiding.

Further, the apparatus may be configured such that in a case where the sensor has detected the user by the time the apparatus finishes moving through the entire region, the processor causes the speaker to output the third sound.

According to this configuration, in a case where the sensor has detected the user by the time the apparatus finishes moving through the entire region, the processor causes the speaker to output the third sound. This makes it possible to detect the user in a case where the user is in a place that does not become a blind spot.

Further, the apparatus may be configured such that in causing the first sound to be outputted, the processor causes the display to display a first display corresponding to the first sound, that in causing the second sound to be outputted, the processor causes the display to display a second display corresponding to the second sound, that in causing the third sound to be outputted, the processor causes the display to display a third display corresponding to the third sound, and that in causing the fourth sound to be outputted, the processor causes the display to display a fourth display corresponding to the fourth sound.

According to this configuration, in causing the first sound to be outputted, the processor causes the display to display a first display corresponding to the first sound. Further, in causing the second sound to be outputted, the processor causes the display to display a second display corresponding to the second sound. Further, in causing the third sound to be outputted, the processor causes the display to display a third display corresponding to the third sound. Further, in causing the fourth sound to be outputted, the processor causes the display to display a fourth display corresponding to the fourth sound.

Accordingly, in addition to a sound, a display corresponding to the sound is displayed on the display. This allows the user to grasp the current situation not only through hearing but also through sight.

Further, the apparatus may be configured such that the display displays a facial expression of the apparatus with both eyes and a mouth, that the first sound indicates a start of hide-and-seek, and that the first display indicates a smile.

According to this configuration, after the apparatus has moved to the first region, the first sound indicating the start of hide-and-seek is outputted and the first display indicating a simile is displayed with both eyes and the mouth. This makes it possible to notify the user of the start of hide-and-seek.

Further, the apparatus may be configured such that the display displays a facial expression of the apparatus with both eyes and a mouth, that the second sound indicates that the apparatus has found the user, and that the second display indicates a smile.

According to this configuration, after the apparatus has moved to the first region, the second sound indicating that the apparatus has found the user is outputted and the second display indicating a simile is displayed with both eyes and the mouth. This makes it possible to determine the outcome of hide-and-seek by encouraging the user hiding in the blind spot to come out of the blind spot.

Further, the apparatus may be configured such that the display displays a facial expression of the apparatus with both eyes and a mouth, that the third sound indicates that the apparatus has won a victory over the user in hide-and-seek, and that the third display indicates a smile.

According to this configuration, in a case where the processor has determined that the sound thus acquired contains a third speech indicating an admission of defeat in hide-and-seek by the user, the third sound indicating the apparatus has won a victory over the user in hide-and-seek and the third display indicating a smile is displayed with both eyes and the mouth. This makes it possible to notify that user that the apparatus has won a victory over the user in hide-and-seek.

Further, the apparatus may be configured such that the display displays a facial expression of the apparatus with both eyes and a mouth, that the fourth sound indicates that the apparatus has lost to the user in hide-and-seek, and that the fourth display indicates a facial expression of sorrow.

According to this configuration, in a case where the processor has determined that the sound thus acquired does not contains a third speech indicating an admission of defeat in hide-and-seek by the user, the fourth sound indicating the apparatus has lost to the user in hide-and-seek and the fourth display indicating a facial expression of sorrow is displayed with both eyes and the mouth. This makes it possible to notify that user that the apparatus has lost to the user in hide-and-seek.

A robot according to another aspect of the present disclosure includes: a main housing that is a sphere from which a first side part and a second side part opposite to the first side part have been cut; a first spherical crown corresponding to the first side part; and a second spherical crown corresponding to the second side part, and the foregoing apparatus being a robot. This configuration makes it possible to apply the foregoing apparatus to a robot.

A method according to another aspect of the present disclosure is a method by which an apparatus interacts with a user while two-dimensionally moving through a predetermined space, including: in a case where the apparatus has determined that a sound acquired by a microphone contains a first speech to an effect that the user starts hide-and-seek with the apparatus, selecting, with reference to a first table stored in the memory, a first region where the number of blind spots is smallest in the space, the first table associating a plurality of regions included in the space and the numbers of blind spots in the plurality of regions with each other; controlling a movement mechanism to cause the apparatus to move to the first region; causing the speaker to output a first sound; counting a predetermined number; when counting the predetermined number, causing a sensor that detects an electromagnetic wave or sound wave reflected by an object to trace a movement locus of the user; in a case where the apparatus has finished counting the predetermined number, causing the speaker to output a sound indicating that the apparatus has finished counting the predetermined number; in a case where the apparatus has determined that the sound acquired by the microphone contains a second speech indicating that the user has finished hiding, controlling the movement mechanism to cause the apparatus to move through an entire region in the space through which the apparatus is able to move; in a case where the sensor has not detected the user by a time the apparatus finishes moving through the entire region, selecting, with reference to a second table stored in the memory, a first blind spot falling within a predetermined range from an end of the movement locus, the second table associating a blind spot in the space and a position of the blind spot with each other; determining whether the apparatus intentionally loses in hide-and-seek; in a case where the apparatus has determined that the apparatus does not intentionally lose, controlling the movement mechanism to cause the apparatus to move to the first blind spot; causing the speaker to output a second sound; in a case where the apparatus has determined that the sound acquired by the microphone contains a third speech indicating an admission of defeat in hide-and-seek by the user, causing the speaker to output a third sound; and in a case where the apparatus has determined that the sound acquired by the microphone does not contain the third speech, causing the speaker to output a fourth sound.

According to this configuration, in a case where the apparatus has determined that a sound acquired by a microphone contains a first speech to the effect that the user starts hide-and-seek with the apparatus, the apparatus selects, with reference to a first table stored in the memory, a first region where the number of blind spots is smallest in the space. The first table associates a plurality of regions included in the space and the numbers of blind spots in the plurality of regions with each other. The apparatus controls a movement mechanism to cause the apparatus to move to the first region. The apparatus causes the speaker to output a first sound. The apparatus counts a predetermined number. When counting the predetermined number, the apparatus causes a sensor that detects an electromagnetic wave or sound wave reflected by an object to trace a movement locus of the user. In a case where the apparatus has finished counting the predetermined number, the apparatus causes the speaker to output a sound indicating that the apparatus has finished counting the predetermined number. In a case where the apparatus has determined that the sound acquired by the microphone contains a second speech indicating that the user has finished hiding, the apparatus controls the movement mechanism to cause the apparatus to move through an entire region in the space through which the apparatus is able to move. In a case where the sensor has not detected the user by the time the apparatus finishes moving through the entire region, the apparatus selects, with reference to a second table stored in the memory, a first blind spot falling within a predetermined range from an end of the movement locus. The second table associates a blind spot in the space and a position of the blind spot with each other. The apparatus determines whether the apparatus intentionally loses in hide-and-seek. In a case where the apparatus has determined that the apparatus does not intentionally lose, the apparatus controls the movement mechanism to cause the apparatus to move to the first blind spot. The apparatus causes the speaker to output a second sound. In a case where the apparatus has determined that the sound acquired by the microphone contains a third speech indicating an admission of defeat in hide-and-seek by the user, the apparatus causes the speaker to output a third sound. In a case where the apparatus has determined that the sound acquired by the microphone does not contain the third speech, the apparatus causes the speaker to output a fourth sound.

Accordingly, after the movement locus of the user has been traced by the sensor when the predetermined number has been counted and the user is hiding in the first region where the number of blind spots is smallest in the space, a movement to the entire region through which the apparatus is able to move is started, and in a case where the sensor has not detected the user by the time the apparatus finishes moving through the entire region, the first blind spot falling within the predetermined range from the end of the movement locus of the user is selected and the apparatus is moved to the first blind spot. Note here that the first blind spot can be said to be a blind spot in which the user is highly likely to have hidden, as the first blind spot falls within the predetermined range from the end of the movement locus of the user. This makes it possible to identify a blind spot in which the user is highly likely to be hiding and that cannot been seen from the apparatus.

A non-transitory computer-readable recording medium storing a program according to another aspect of the present disclosure is a non-transitory computer-readable recording medium storing a program for interacting with a user while two-dimensionally moving through a predetermined space, the program causing a processor of an apparatus for interacting with the user to execute a process including: in a case where the processor has determined that a sound acquired by a microphone contains a first speech to an effect that the user starts hide-and-seek with the apparatus, selecting, with reference to a first table stored in the memory, a first region where the number of blind spots is smallest in the space, the first table associating a plurality of regions included in the space and the numbers of blind spots in the plurality of regions with each other; controlling a movement mechanism to cause the apparatus to move to the first region; causing the speaker to output a first sound; counting a predetermined number; when counting the predetermined number, causing a sensor that detects an electromagnetic wave or sound wave reflected by an object to trace a movement locus of the user; in a case where the processor has finished counting the predetermined number, causing the speaker to output a sound indicating that the apparatus has finished counting the predetermined number; in a case where the processor has determined that the sound acquired by the microphone contains a second speech indicating that the user has finished hiding, controlling the movement mechanism to cause the apparatus to move through an entire region in the space through which the apparatus is able to move; in a case where the sensor has not detected the user by a time the apparatus finishes moving through the entire region, selecting, with reference to a second table stored in the memory, a first blind spot falling within a predetermined range from an end of the movement locus, the second table associating a blind spot in the space and a position of the blind spot with each other; determining whether the apparatus intentionally loses in hide-and-seek; in a case where the processor has determined that the apparatus does not intentionally lose, controlling the movement mechanism to cause the apparatus to move to the first blind spot; causing the speaker to output a second sound; in a case where the processor has determined that the sound acquired by the microphone contains a third speech indicating an admission of defeat in hide-and-seek by the user, causing the speaker to output a third sound; and in a case where the processor has determined that the sound acquired by the microphone does not contain the third speech, causing the speaker to output a fourth sound.

In a case where the processor has determined that a sound acquired by a microphone contains a first speech to the effect that the user starts hide-and-seek with the apparatus, the processor selects, with reference to a first table stored in the memory, a first region where the number of blind spots is smallest in the space. The first table associates a plurality of regions included in the space and the numbers of blind spots in the plurality of regions with each other. The processor controls a movement mechanism to cause the apparatus to move to the first region. The processor causes the speaker to output a first sound. The processor counts a predetermined number. When counting the predetermined number, the processor causes a sensor that detects an electromagnetic wave or sound wave reflected by an object to trace a movement locus of the user. In a case where the processor has finished counting the predetermined number, the processor causes the speaker to output a sound indicating that the apparatus has finished counting the predetermined number. In a case where the processor has determined that the sound acquired by the microphone contains a second speech indicating that the user has finished hiding, the processor controls the movement mechanism to cause the apparatus to move through an entire region in the space through which the apparatus is able to move. In a case where the sensor has not detected the user by the time the apparatus finishes moving through the entire region, the processor selects, with reference to a second table stored in the memory, a first blind spot falling within a predetermined range from an end of the movement locus. The second table associates a blind spot in the space and a position of the blind spot with each other. The apparatus determines whether the apparatus intentionally loses in hide-and-seek. In a case where the processor has determined that the apparatus does not intentionally lose, the apparatus controls the movement mechanism to cause the apparatus to move to the first blind spot. The apparatus causes the speaker to output a second sound. In a case where the processor has determined that the sound acquired by the microphone contains a third speech indicating an admission of defeat in hide-and-seek by the user, the apparatus causes the speaker to output a third sound. In a case where the processor has determined that the sound acquired by the microphone does not contain the third speech, the apparatus causes the speaker to output a fourth sound.

Accordingly, after the movement locus of the user has been traced by the sensor when the predetermined number has been counted and the user is hiding in the first region where the number of blind spots is smallest in the space, a movement to the entire region through which the apparatus is able to move is started, and in a case where the sensor has not detected the user by the time the apparatus finishes moving through the entire region, the first blind spot falling within the predetermined range from the end of the movement locus of the user is selected and the apparatus is moved to the first blind spot. Note here that the first blind spot can be said to be a blind spot in which the user is highly likely to have hidden, as the first blind spot falls within the predetermined range from the end of the movement locus of the user. This makes it possible to identify a blind spot in which the user is highly likely to be hiding and that cannot been seen from the apparatus.

An embodiment for carrying out the present disclosure is described below with reference to the drawings. Identical signs refer to identical objects throughout all of the following drawings unless otherwise noted. It should be noted that each of the embodiments to be described below shows an example of the present disclosure. The numerical values, shapes, constituent elements, steps, and orders of steps that are shown in the following embodiments are mere examples and are not intended to limit the present disclosure. Further, those of the constituent elements according to the following embodiments which are not recited in an independent claim representing the most generic concept are described as optional constituent elements. Further, the contents of each of the embodiments may be combined with the contents of the other embodiment.

Embodiment

Figure 2:
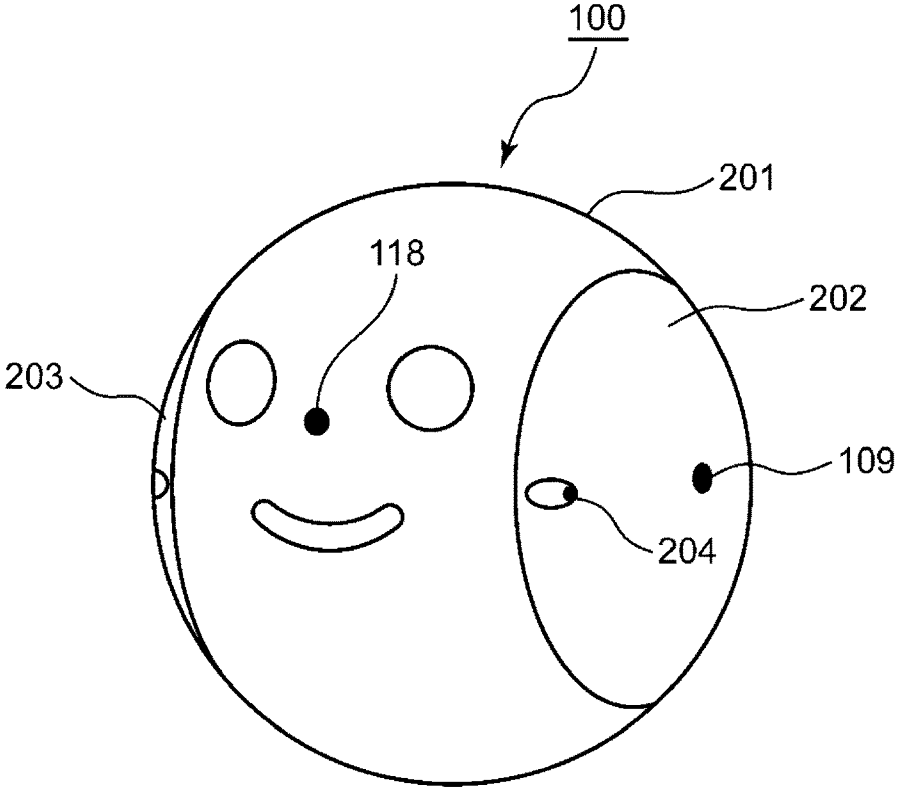
FIG. 2 is an external perspective view of a robot according to an embodiment of the present disclosure.
Figure 3:
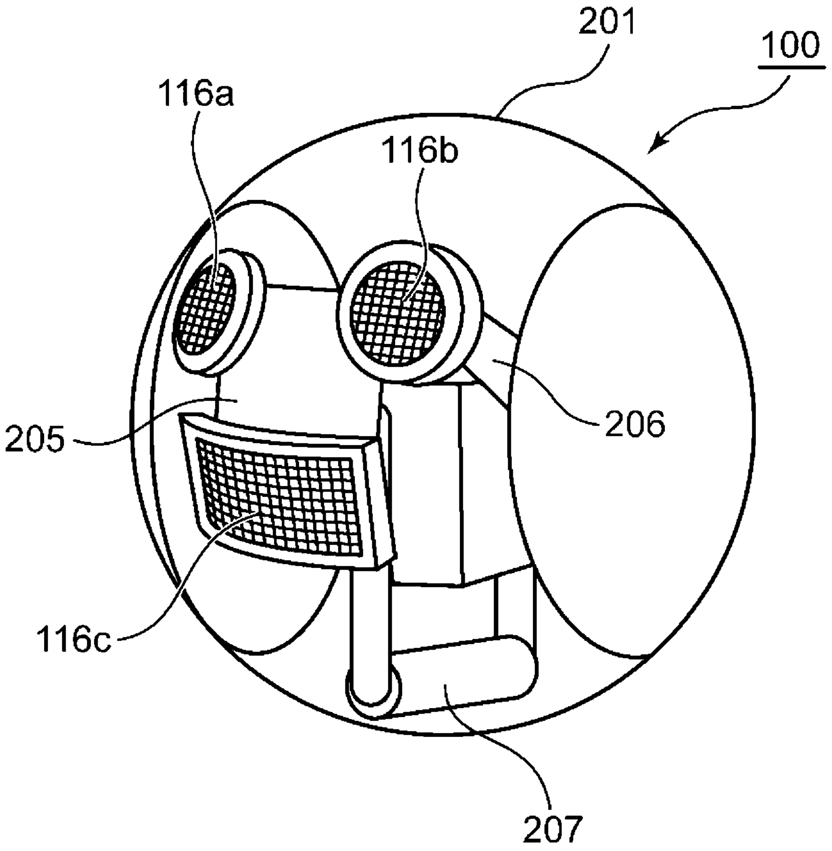
FIG. 3 is an internal perspective view of the robot according to the embodiment of the present disclosure.

FIG. 2 is an external perspective view of a robot 100, which is an example of an interaction apparatus 200, according to an embodiment of the present disclosure, and FIG. 3 is an internal perspective view of the robot 100, which is an example of the interaction apparatus 200, according to the embodiment of the present disclosure.

As shown in FIG. 2, the robot 100 (interaction apparatus 200) includes a main housing 201 that is spherical, a first spherical crown 202, and a second spherical crown 203. The main housing 201, the first spherical crown 202, and the second spherical crown 203 constitute a sphere as a whole. That is, the robot 100 has a spherical shape. The robot 100 interacts with a user while two-dimensionally moving through a predetermined space. The first spherical crown 202 and the second spherical crown 203 is coupled to each other by a shaft (not illustrated) provided in the main housing 201. Meanwhile, the shaft and the main housing 201 are not fixed to each other. Accordingly, rotating the shaft causes the first spherical crown 202 and the second spherical crown 203 to rotate, allowing the robot 100 to move forward or move backward.

Further, as shown in FIG. 2, the robot 100 includes a speaker 118 in the main housing 201, and includes a camera 204 and a microphone 109 in the first spherical crown 202. The speaker 118 outputs a sound of the robot 100. The camera 204 acquires a picture of an environment surrounding the robot 100. The microphone 109 acquires a sound of the environment surrounding the robot 100. In the present aspect, the robot 100 includes the speaker 118 in the main housing 201. However, this does not imply any limitation. The robot 100 needs only include the speaker 118 in any of the main housing 201, the first spherical crown 202, and the second spherical crown 203. In the present aspect, the robot 100 includes the camera 204 in the first spherical crown 202. However, this does not imply any limitation. The robot 100 needs only include the camera 204 in any of the main housing 201, the first spherical crown 202, and the second spherical crown 203. Adjusting the locations and number of cameras 204 makes it possible to acquire a 360-degree picture of an area around the robot 100. In the present aspect, the robot 100 includes the microphone 109 in the first spherical crown 202. However, this does not imply any limitation. The robot 100 needs only include the microphone 109 in any of the main housing 201, the first spherical crown 202, and the second spherical crown 203.

As shown in FIG. 3, the robot 100 includes a first display unit **116*a*, a second display unit 116*b*, and a third display unit 116*c* inside the main housing 201. The first display unit 116*a*, the second display unit 116*b*, and the third display unit 116*c* are seated on a fixed metal plate 205. The fixed metal plate 205 is attached to the shaft via an arm 206. The first display unit 116*a*, the second display unit 116*b*, and the third display unit 116*c* are constituted, for example, by a plurality of light-emitting diodes. The first display unit 116*a*, the second display unit 116*b*, and the third display unit 116*c* display a facial expression of the robot 100. Specifically, the first display unit 116*a*, the second display unit 116*b*, and the third display unit 116*c* display a part of the face, e.g. the eyes or mouth, of the robot 100 as shown in FIG. 2 by individually controlling the turning on of the plurality of light-emitting diodes. In the example shown in FIGS. 2 and 3, the first display unit 116***a*, the second display unit 116*b*, and the third display unit 116*c* display images of the right eye, the left eye, and the mouth, respectively. Moreover, the images of the right eye, the left eye, and the mouth are emitted outward through the main housing 201, which is composed of a transparent or semitransparent member.

As shown in FIG. 3, the robot 100 includes a weight 207 in a lower part of the inside of the main housing 201. For this reason, the robot 100 has its center of gravity located below the center of the main housing 201. This allows the robot 100 to stably operate.

Figure 4:
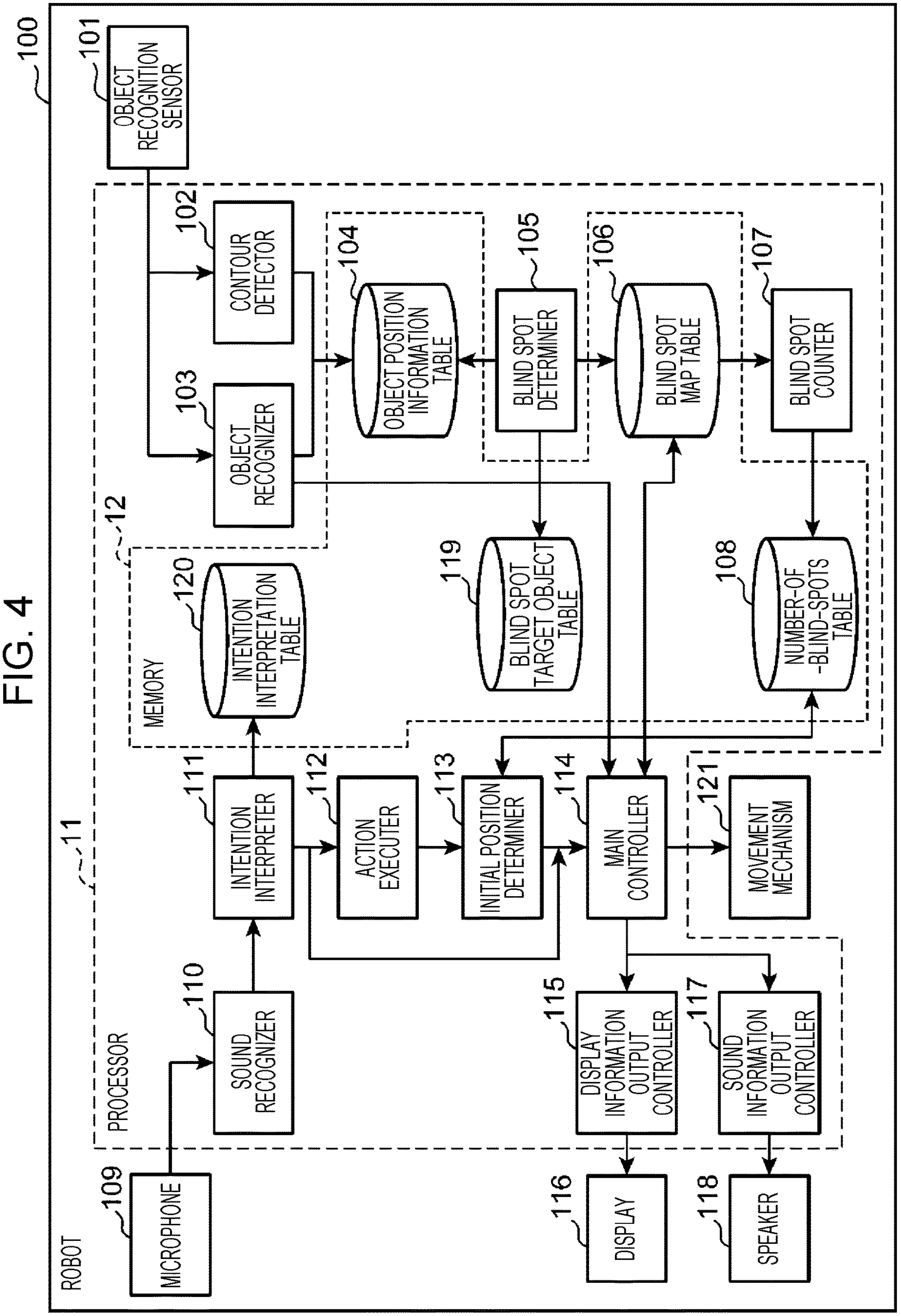
FIG. 4 is a block diagram showing an example of a configuration of the robot according to the embodiment of the present disclosure.

FIG. 4 is a block diagram showing an example of a configuration of the robot 100 according to the embodiment of the present disclosure.

The robot 100 includes a processor 11, a memory 12, one or more object recognition sensors 101, one or more microphones 109, one or more display 116, one or more speakers 118, and a movement mechanism 121.

The movement mechanism 121 causes the robot 100 to move. The movement mechanism 121 includes a first drive wheel 210, a second drive wheel 211, a first motor 212, and a second motor 213 (not illustrated).

The processor 11 includes a contour detector 102, an object recognizer 103, a blind spot determiner 105, a blind spot counter 107, a sound recognizer 110, an intention interpreter 111, an action executer 112, an initial position determiner 113, a main controller 114, a display information output controller 115, and a sound information output controller 117. The memory 12 is for example a nonvolatile semiconductor memory and includes an object position information table 104, a blind spot map table 106, a number-of-blind-spots table 108, a blind spot target object table 119, and an intention interpretation table 120. The processor 11 and the memory 12 are disposed in a control circuit 209 (not illustrated).

The object recognition sensor 101 is a sensor, attached to the robot 100, that can recognize the shape of an object. The object recognition sensor 101 includes, for example, at least one of a camera, an infrared sensor, an ultrasonic sensor, and a laser sensor. The object recognition sensor 101 detects an electromagnetic wave or sound wave reflected by an object. A sensor value that is acquired by the object recognition sensor 101 is outputted to the contour detector 102 and the object recognizer 103. The object recognition sensor 101 includes a camera 208 (not illustrated).

The contour detector 102 receives a sensor value from the object recognition sensor 101, determines the shape of an object in a room, and detects the contours of the object. The contour detector 102 stores, in the object position information table 104, information indicating the contours of the object thus detected.

The object recognizer 103 receives a sensor value from the object recognition sensor 101 and recognizes the class of an object in a room. In making a determination, the object recognizer 103 recognizes what an object is that is installed in the room. An object that the object recognizer 103 recognizes is not limited to an installation, such as a table, a television, or a curtain, that is installed in the room, and the room per se is recognized as an object. The object recognizer 103 stores, in the object position information table 104, information indicating the class of the object thus recognized. Further, the object recognizer 103 also outputs a recognition result to the main controller 114.

The object position information table 104 receives the contours of an object as detected by the counter detector 102 and the class of the object as recognized by the object recognizer 103 and has stored therein in association with one another an object ID for identifying the object, a position range indicating the contours of the object, and the object class.

FIG. 5 is a diagram showing an example of the object position information table 104 according to the present embodiment. An object ID 301 is granted as information that identifies an object in storing its position range and object class. A position range 302 indicates the contours of an object and is detected by the counter detector 102. The position range 302 in the object position information table 104 represents a region of a room or the object in a two-dimensional plane. The position range 302 is expressed, for example, by an aggregate of coordinates of the apices of a polygon representing the region of the room or the object. An object class 303 indicates the class of an object and is recognized by the object recognizer 103.

The blind spot target object table 119 has stored therein a list of objects that can constitute blind spots for the robot 100 when the robot 100 plays with a young child. The young child is an example of the user, and a target with which the robot 100 interacts is not limited to the young child.

FIG. 6 is a diagram showing an example of the blind spot target object table 119 according to the present embodiment. As shown in FIG. 6, the blind spot target object table 119 has stored therein blind spot target objects 501 indicating objects that can constitute blind spots for the robot 100 when the robot 100 plays with the young child. Examples of the blind spot target objects 501 include a sofa, a curtain, a futon, a blanket, and a closet.

The blind spot determiner 105 refers to the object position information table 104 and the blind spot target object table 119, compares an object class of the object position information table 104 and a blind spot target object of the blind spot target object table 119 with each other, and creates the blind spot map table 106. The blind spot 105 determines the object class as a blind spot target in a case where the object class of the object position information table 104 is included in the blind spot target object table 119.

Figures 7, 8:
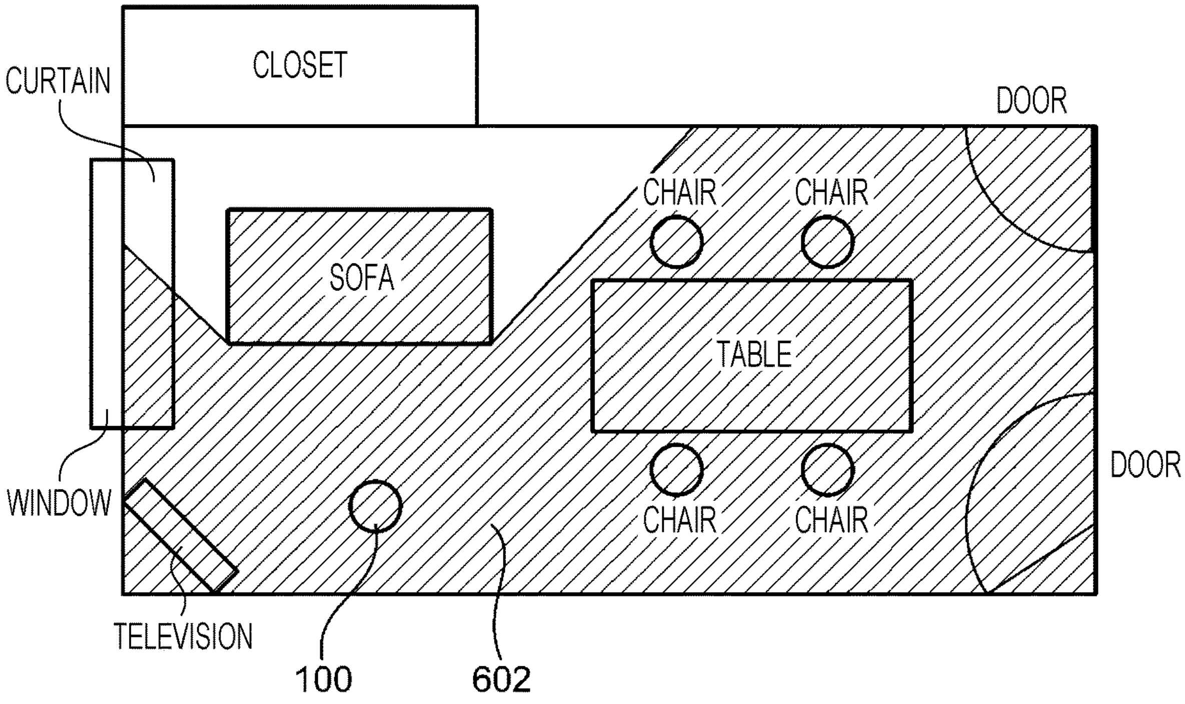
FIG. 7 is a diagram showing an example of a blind spot map table according to the present embodiment.
FIG. 8 is a diagram for explaining a visual field of the robot according to the present embodiment.

FIG. 7 is a diagram showing an example of the blind spot map table 106 according to the present embodiment.

The blind spot determiner 105 creates the blind spot map table 106 that, as illustrated in FIG. 7, associates a blind-spot region ID 401, a position range 402, a region class 403, and a blind spot target 404 with one another for each object subjected to a determination as to whether it constitutes a blind spot. The blind spot determiner 105 always monitors changes in value of the object position information table 104, and in the case of a change in value of the object position information table 104, the blind spot determiner 105 compares an object class of the object position information table 104 and a blind spot target object of the blind spot target object table 119 with each other and updates the blind spot map table 106.

The blind spot map table 106 is a table that indicates whether individual regions indicating objects in a room become blind spots. As illustrated in FIG. 7, the blind spot map table 106 is represented by a set of the blind-spot region ID 401, the position range 402, the region class 403, and the blind spot target 404 and has stored therein for each region information indicating whether it becomes a blind spot target.

The blind spot counter 107 divides a region in a room through which the robot 100 is able to move, counts, for each of the plurality of regions thus divided, the number of objects of blind spot target, included in the objects of blind spot target of the blind spot map table 106, that do not fall within a visual field range of the robot 100 in that region, and stores the number of objects of blind spot target in the number-of-blind-spot table 108.

Figures 9, 10:
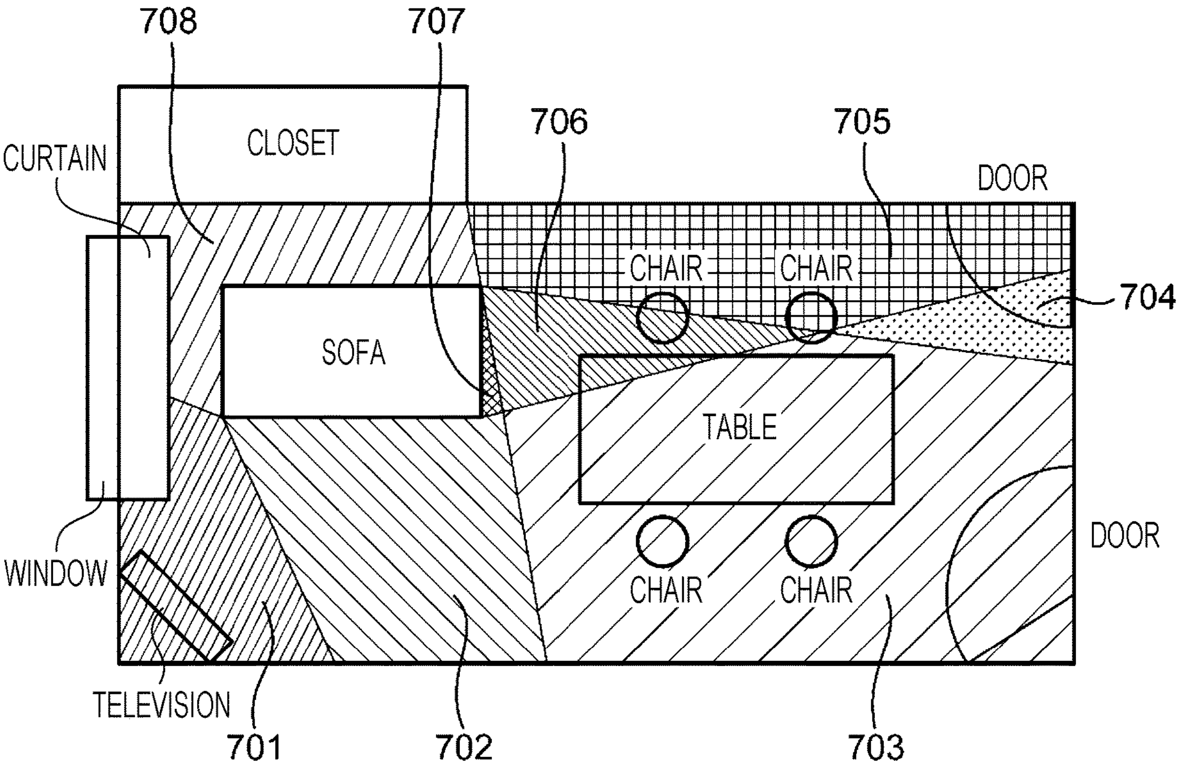
FIG. 9 is a diagram showing examples of a plurality of regions divided according to the number of blind spots according to the present embodiment.
FIG. 10 is a diagram showing an example of a number-of-blind-spots table according to the present embodiment.

FIG. 8 is a diagram for explaining the visual field range of the robot 100 according to the present embodiment. FIG. 9 is a diagram showing examples of a plurality of regions divided according to the number of blind spots according to the present embodiment.

In a case where the robot 100 is in a position shown in FIG. 8, a visual field range 602 from the robot 100 is a range indicated by diagonal lines. It should be noted that the camera that the robot 100 includes has such a visual field as to be able to shoot 360 degrees in a horizontal direction. The blind spot counter 107 calculates, as the number of blind spots, the number of position ranges of objects of blind spot target of the blind spot map table 106 that do not overlap the visual field range 602 of the robot 100. In FIG. 8, the number of blind spots is 1, as only the position range of the closet, which is an object of blind spot target, does not overlap the visual field range 602. Once the blind spot counter 107 counts the number of blind spots for all positions in a room shown in FIG. 8 through which the robot 100 is able to move, the room is divided into a plurality of regions 701 to 708 shown in FIG. 9. In FIG. 9, the number of blind spots in each of the regions 701, 703, and 705 is 0, the number of blind spots in each of the regions 702, 704, and 706 is 1, and the number of blind spots in each of the regions 707 and 708 is 2.

The blind spot counter 107 calculates the number of blind spots in a plurality of positions in the room on the basis of the visual field range of the robot 100 and the positions of objects that constitute blind spot targets, and divides the room into a plurality of regions according to the number of blind spots. The blind spot counter 107 stores number-of-blind-spots IDs granted to identify the plurality of regions, position ranges indicating the respective ranges of the plurality of regions, the respective numbers of blind spots of the plurality of regions, and blind-spot region IDs for identifying the respective blind-spot regions of the plurality of regions in the number-of-blind-spots table 108 in association with one another.

FIG. 10 is a diagram showing an example of the number-of-blind-spots table 108 according to the present embodiment. In a case where the regions are divided as shown in FIG. 9, the number-of-blind-spots table 108 has information stored therein in a format illustrated in FIG. 10. The number-of-blind-spots table 108 (first table) associates the plurality of regions included in the room (predetermined space) and the numbers of blind spots in the plurality of regions with each other.

The number-of-blind-spots table 108 is created and updated by the blind spot counter 107. As shown in FIG. 10, the number-of-blind-spots table 108 is represented by a set of a number-of-blind-spots region ID 801, a position range 802, the number of blind spots 803, and a blind-spot region ID 804, and has stored therein the number of blind spots for each region in the room. The number-of-blind-spots region ID 801 is identification information for identifying each of the plurality of divided regions. The position range 802 in the number-of-blind-spots table 108 represents the plurality of divided regions in a two-dimensional plane. The position range 802 is expressed, for example, by an aggregate of coordinates of the apices of a polygon representing each of the plurality of regions. The blind-spot region ID 804 corresponds to the blind-spot region ID 401 of the blind spot map table 106.

The microphone 109 acquires a sound of an area around the robot 100. The microphone 109 collects a sound that the young child produces in speaking to the robot 100, and outputs audio data to the sound recognizer 110.

The sound recognizer 110 receives a sound from the microphone 109 and converts it into a speech text of the young child. On completion of the sound conversion, the sound recognizer 110 outputs the resulting speech text to the intention interpreter 111.

The intention interpreter 111 receives a speech text from the sound recognizer 110 and determines whether the speed text thus received is included in the intention interpretation table 120. In a case where the intention interpreter 111 has determined that the speed text is included in the intention interpretation table 120, the intention interpreter 111 determines the content of an action that the robot 100 should execute. The intention interpreter 111 outputs, to the action executer 112 and the main controller 114, information indicating the content of the action thus determined that the robot 100 should execute.

FIG. 11 is a diagram showing an example of the intention interpretation table 120 according to the present embodiment.

The intention interpretation table 120 has information stored therein in a format illustrated in FIG. 11. The intention interpretation table 120 is represented by a set of a text ID 901 for identifying a speech text, a text 902 indicating the speech text, and an action content 903 indicating an action of the robot 100 corresponding to the speech text. The intention interpreter 111 searches for a text 902 that perfectly or partially matches a speech text received from the sound recognizer 110 and, in a case where there exists a text 902 corresponding to the speech text, extracts an action content 903 corresponding to the text 902.

The action executer 112 receives information indicating the action content 903 from the intention interpreter 111 and executes, on the robot 100, an action corresponding to the action content thus determined. In playing a game, supposed in the present disclosure, in which the robot 100 seeks for and finds a young child hiding in a room, the action executer 112 instructs the initial position determiner 113 to determine an initial position of the robot 100 in the room at the start of the game.

In a case where the intention interpreter 111 has determined that an acquired sound contains a first speech to the effect that the user starts to play hide-and-seek with the robot 100, the initial position determiner 113 selects, with reference to the number-of-blind-spots table 108 (first table) stored in the memory 12, a region (first region) where the number of blind spots is smallest in the room (predetermined space).

The initial position determiner 113 is called by the action executer 112 to select, with reference to the number-of-blind-spots table 108, a region where the number of blind spots 803 is smallest. In a case where there exist a plurality of regions where the number of blind spots 803 is smallest, the initial position determiner 113 selects one region from among the plurality of regions. In so doing, there is no particular limit to a method for selecting a region, provided one region is selected. For example, the initial position determiner 113 may randomly select one region from among the plurality of regions where the number of blind spots 803 is smallest or may calculate the area of each region from the position range 802 and selects a region that is largest in area. The initial position determiner 113 instructs the main controller 114 to cause the robot 100 to move to the region thus selected.

The main controller 114 receives a region indicating the initial position of the robot 100 from the initial position determiner 113. At a stage where the region has been designated, the main controller 114 executes a sequence of the game, supposed in the present disclosure, in which the robot 100 seeks for and finds a young child hiding in a room. It should be noted that the game in the present embodiment is hide-and-seek. Further, in hide-and-seek, the young child hides and the robot 100 seeks for the young child. Further, the outcome of usual hide-and-seek is determined by the robot 100 finding (detecting) the young child. However, the outcome of hide-and-seek of the present embodiment is further determined by the robot 100 moving to the blind spot in which the young child is hiding, outputting a sound indicating that the robot 100 has found the young child, and acquiring a speech sound of the young child indicating whether he/she has lost in hide-and-seek.

First, the main controller 114 transmits, to the display information output controller 115, facial expression data to be displayed in preparing for hide-and-seek and transmits, to the sound information output controller 117, audio data to be outputted in preparing for hide-and-seek. The display information output controller 115 generates a facial expression of the robot 100 on the basis of the facial expression data. The sound information output controller 117 generates a sound of the robot 100 on the basis of the audio data.

After that, the main controller 114 instructs the movement mechanism 121 to move to a region that becomes an initial position determined by the initial position determiner 113 and monitors completion of movement of the robot 100. The main controller 114 controls the movement mechanism 121 to cause the robot 100 to move to a region (first region) selected by the initial position determiner 113. In accordance with the instruction from the main controller 114, the movement mechanism 121 causes the robot 100 to move to the initial position. It should be noted that the initial position is for example a center (barycentric) position of the region thus selected.

On completion of movement of the robot 100, the main controller 114 starts hide-and-seek. The main controller 114 transmits, to the display information output controller 115, facial expression data to be displayed in preparing for hide-and-seek and transmits, to the sound information output controller 117, audio data to be outputted in preparing for hide-and-seek. The sound information output controller 117 generates, on the basis of the audio data, a first sound indicating the start of hide-and-seek and causes the speaker 118 to output the first sound. The display information output controller 115 generates a facial expression of the robot 100 on the basis of the facial expression data and, in causing the first sound to be outputted, causes the display 116 to display a first display corresponding to the first sound. The display 116 displays the facial expression of the robot 100 with both eyes and the mouth. The first display indicates a smile.

Then, the main controller 114 counts a predetermined number. The main controller 114 starts to count time during which the young child hides and, after a predetermined period of time has elapsed, checks with the young child whether he/she has finished hiding. When counting the predetermined number, the main controller 114 causes the object recognition sensor 101 to trace a movement locus of the user. While counting, the main controller 114 tracks a motion of the young child in accordance with data that it receives from the object recognizer 103. In a case where the main controller 114 has finished counting the predetermined number, the sound information output controller 117 causes the speaker 118 to output a sound indicating that the main controller has finished counting the predetermined number. By receiving, from the intention interpreter 111, an action of starting seeking or postponing the start of seeking, the main controller 114 checks whether the young child has finished hiding. On receiving the action of starting seeking or postponing the start of seeking, the main controller 114 counts again the time during which the young child hides.

In a case where the main controller 114 has determined that a sound acquired by the microphone 109 contains a speech (second speech) indicating that the user has finished hiding, the main controller 114 controls the movement mechanism 121 to cause the robot 100 to move through the entire region in the room (predetermined space) through which the robot 100 is able to move. On receiving the action of starting seeking from the intention interpreter 111, the main controller 114 instructs the movement mechanism 121 to move through every place in the room in order to find the hiding young child. In accordance with this instruction, the robot 100 starts to move through the inside of the room.

While the robot 100 is moving, the main controller 114 receives, from the object recognizer 103, an image of any object that comes into sight of the robot 100. In a case where the object recognition sensor 101 has detected the young child by the time the robot 100 finishes moving through the entire region, the sound information output controller 117 causes the speaker 118 to output a sound (third sound) indicating that the robot 100 has won a victory over the young child in hide-and-seek. That is, in a case where the young child, who is a target of seeking, comes into sight of the robot 100 while the robot 100 is moving, the main controller 114 causes the robot 100 to move to the position of the young child, transmits, to the display information output controller 115, facial expression data indicating that the robot 100 has found the young child, and transmits, to the sound information output controller 117, audio data indicating the robot 100 has found the young child.

In a case where the object recognition sensor 101 has not detected the young child by the time the robot 100 finishes moving through the entire region, the main controller 114 selects, with reference to the blind spot map table 106 (second table) stored in the memory 12, a blind spot (first blind spot) falling within a predetermined range from an end of the movement locus of the young child. That is, in a case where the young child, who is the target of seeking, comes into sight of the robot 100 while the robot 100 is moving, the main controller 114 extracts, with reference to the blind spot map table 106, a blind-spot region that lies ahead of the end of the locus of the young child traced during the counting.

Further, since the robot 100 stores the movement locus of the young child, the robot 100 can find the young child with a high probability by selecting the blind spot closest to the end of the movement locus, so that there is a possibility that the robot 100 always wins a victory over the young child in hide-and-seek. To address this problem, the robot 100 is configured to lose to the young child in hide-and-seek by intentionally making a mistake with a predetermined probability in finding the position in which the young child is hiding. The main controller 114 determines whether the robot 100 intentionally loses in hide-and-seek. In a case where the main controller 114 has determined that the robot 100 does not intentionally lose, the main controller 114 controls the movement mechanism 121 to cause the robot 100 to move to the blind-spot region (first blind spot) thus extracted. In a case where a plurality of blind-spot regions have been extracted, the main controller 114 selects one blind-spot region as a destination of movement.

Further, in a case where the main controller 114 has determined that the robot 100 intentionally loses, the main controller 114 selects, with reference to the blind spot map table 106 (second table), a blind spot (second blind spot) falling outside the predetermined range from the end of the movement locus of the young child. Then, the main controller 114 controls the movement mechanism 121 to cause the robot 100 to move to the blind spot (second blind spot) thus selected.

After completion of movement to the blind spot (first blind spot) falling within the predetermined range from the end of the movement locus of the young child or the blind spot (second blind spot) falling outside the predetermined range from the end of the movement locus of the young child, the sound information output controller 117 causes the speaker 118 to output a second sound indicating that the robot 100 has found the young child. In causing the second sound to be outputted, the display information output controller 115 causes the display 116 to display a second display corresponding to the second sound. The second display indicates a smile. That is, the main controller 114 transmits, to the display information output controller 115, facial expression data indicating that the robot 100 has found the young child, and transmits, to the sound information output controller 117, audio data indicating that the robot 100 has found the young child.

The main controller 114 determines whether a sound acquired by the microphone 109 contains a speech (third speech) indicating an admission of defeat by the young child. In a case where the main controller 114 has determined that the sound acquired by the microphone 109 contains the speech (third speech) indicating an admission of defeat by the young child, the sound information output controller 117 causes the speaker 118 to output a sound (third sound) indicating that the robot 100 has won a victory over the young child in hide-and-seek. In causing the third sound to be outputted, the display information output controller 115 causes the display 116 to display a third display corresponding to the third sound. The third display indicates a smile. In the case of a reception from the intention interpreter 111 to the effect that the young child has made a speech indicating he/she has been found by the robot 100, the main controller 114 transmits, to the display information output controller 115, facial expression data indicating that the robot 100 has won, and transmits, to the sound information output controller 117, audio data indicating that the robot 100 has won. The sound information output controller 117 generates, on the basis of the audio data, the third sound indicating that the robot 100 has won, and causes the speaker 118 to output the third sound. The display information output controller 115 generates, on the basis of the facial expression data, the third display indicating that the robot 100 has won, and causes the display 116 to display the third display.

On the other hand, in a case where the intention interpreter 111 has determined that the sound acquired by the microphone 109 does not contain the speech (third speech) indicating an admission of defeat by the young child, the sound information output controller 117 causes the speaker 118 to output a sound (fourth sound) indicating that the robot 100 has lost to the young child in hide-and-seek. In causing the fourth sound to be outputted, the display information output controller 115 causes the display 116 to display a fourth display corresponding to the fourth sound. The fourth sound indicates a facial expression of sorrow. In the case of a reception from the intention interpreter 111 to the effect that the young child has made a speech indicating that the robot 100 has made a mistake in finding the young child, the main controller 114 transmits, to the display information output controller 115, facial expression data indicating that the robot 100 has been defeated, and transmits, to the sound information output controller 117, audio data indicating that the robot 100 has been defeated. The sound information output controller 117 generates, on the basis of the audio data, the fourth sound indicating that the robot 100 has been defeated, and causes the speaker 118 to output the fourth sound. The display information output controller 115 generates, on the basis of the facial expression data, the fourth display indicating that the robot 100 has been defeated, and causes the display 116 to display the fourth display.

In a case where the intention interpreter 111 has determined that the sound acquired by the microphone 109 does not contain the speech (third speech) indicating an admission of defeat by the young child and where the object recognition sensor 101 has detected the young child hiding in a blind spot (third blind spot) that is not included in the blind spot map table 106 (second table), the main controller 114 may store the third blind spot and the position of the third blind spot in the blind spot map table 106 (second table) in association with each other. That is, in a case where when the robot 100 has been defeated, the place in which the young child was hiding is not included as a blind spot target in the blind spot map table 106, the main controller 114 may add, as a blind spot target to the blind spot map table 106, an object placed in the place in which the young child was hiding.

The display information output controller 115 receives facial expression data of the robot 100 from the main controller 114 and controls how the display 116 performs a display.

The display 116 receives facial expression data from the display information output controller 115 and displays a facial expression of the robot 100. The display 116 is constituted, for example, by an LED (light-emitting diodes), an LCD (liquid crystal display), or an organic EL (electroluminescence). The display 116 may be constituted by one or more displays and may be configured in any way that can express a facial expression of the robot 100. In the present embodiment, the display 116 includes the first to third display unit 116*a*, the second display unit 116*b*, and the third display unit 116*c*, which are shown in FIG. 3.

The sound information output controller 117 receives audio data of the robot 100 from the main controller 114 and controls how the speaker 118 outputs a sound.

The speaker 118 receives audio data from the sound information output controller 117 and reproduces the audio data thus received.

The interaction apparatus 200 includes the processor 11, the memory 12, the object recognition sensor 101, the microphone 109, the display 116, the speaker 118, and the movement mechanism 121. The interaction apparatus 200 does not need to include the display 116.

Further, some or all of the components of the processor 11 and the memory 12 may be provided in a server communicably connected to the robot 100 via a network.

In the following, processes for creating and updating the object position information table 104, the blind spot map table 106, and the number-of-blind-spots table 108 from data of the object recognition sensor 101 are described with reference to FIGS. 12, 13, and 14, respectively.

Figure 12:
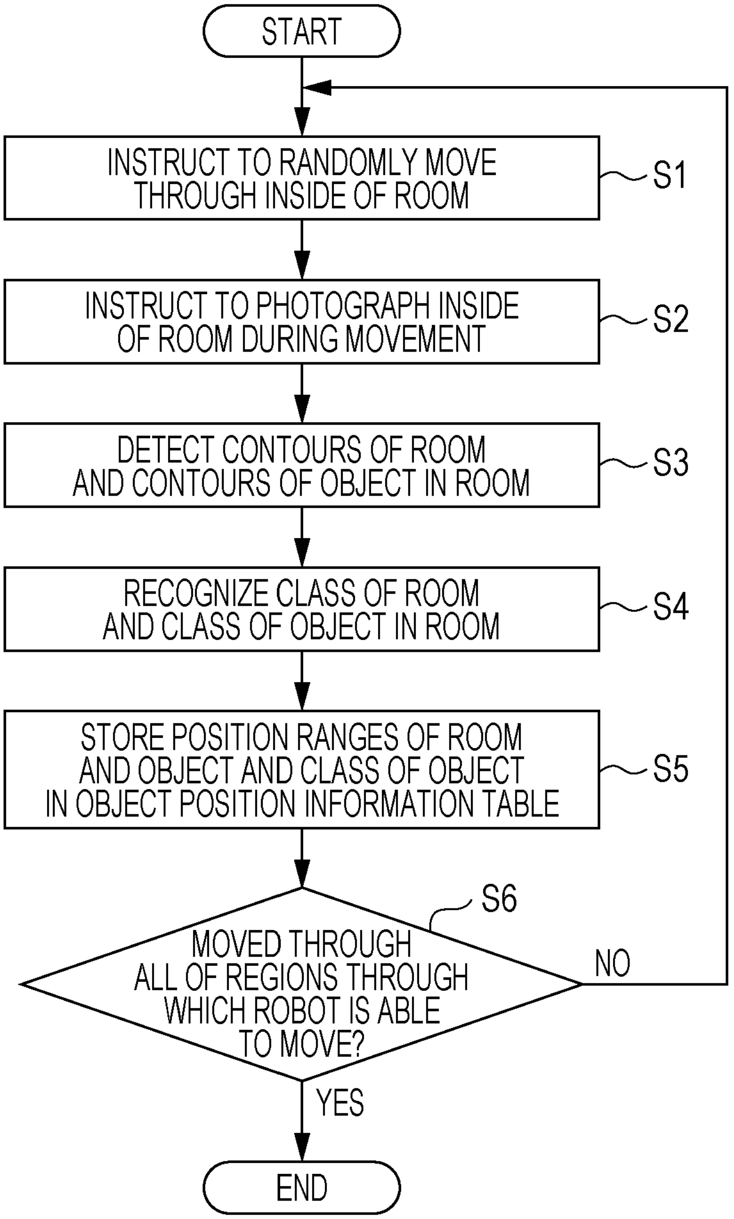
FIG. 12 is a flow chart showing an example of a process for creating the object position information table on the basis of data of an object recognition sensor according to the present embodiment.

FIG. 12 is a flow chart showing an example of the process for creating the object position information table 104 on the basis of the data of the object recognition sensor 101 according to the present embodiment.

First, in step S1, in order to create the object position information table 104, the main controller 114 instructs the movement mechanism 121 so that the robot 100 randomly moves through a region in a room through which the robot 100 is able to move. Autonomously or in accordance with an instruction from the user, the main controller 114 starts a movement to create the object position information table 104. In autonomously creating the object position information table 104, the main controller 114 may start, for example every one day or every one week, a movement to create the object position information table 104. Although step S1 assumes that the robot 100 randomly moves, the robot 100 does not need to randomly move, provided the robot 100 is able to move through every place in the region in the room through which the robot 100 is able to move. In accordance with the instruction from the main controller 114, the movement mechanism 121 causes the robot 100 to randomly move.

Next, in step S2, the main controller 114 instructs the object recognition sensor 101 to photograph the inside of the room while the robot 100 is moving. The object recognition sensor 101 photographs the inside of the room and outputs photographed data to the contour detector 102 and the object recognizer 103.

Next, in step S3, the contour detector 102 detects the contours of the room and the contours of an object in the room using the photographed data outputted from the object recognition sensor 101.

Next, in step S4, the object recognizer 103 recognizes the class of the room and the class of the object in the room using the photographed data outputted from the object recognition sensor 101.

Next, in step S5, the contour detector 102 stores the contours of the room and the contours of the object in the room as position ranges in the object position information table 104, and the object recognizer 103 stores the class of the room and the class of the object in the room as object classes in the object position information table 104. In a case where only the contour detector 102 has stored a position range in the object position information table 104, only the object ID 301 and the position range 302 are stored.

Next, in step S6, the main controller 114 determines whether the robot 100 has moved through the whole of the region through which the robot 100 is able to move. In a case where the main controller 114 has determined here that the robot 100 has moved through the whole of the region through which the robot 100 is able to move (YES in step S6), the process is ended.

On the other hand, In a case where the main controller 114 has determined that the robot 100 has not moved through the whole of the region through which the robot 100 is able to move (NO in step S6), the process returns to step S1.

Figure 13:
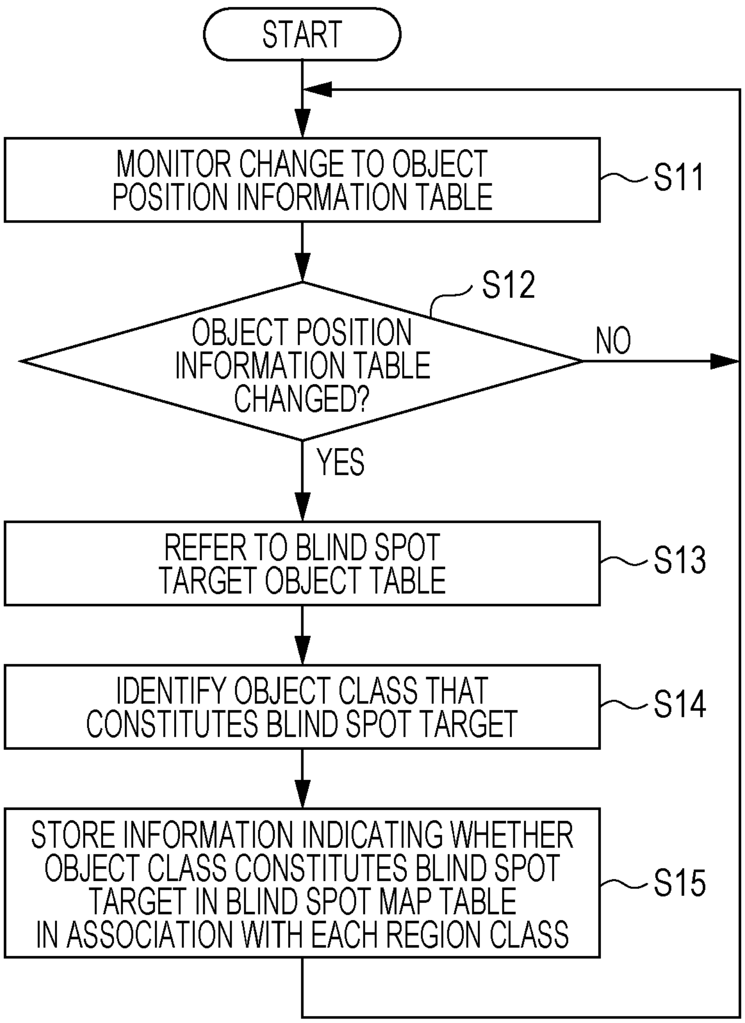
FIG. 13 is a flow chart showing an example of a process for creating the blind spot map table on the basis of data of the object position information table according to the present embodiment.

FIG. 13 is a flow chart showing an example of the process for creating the blind spot map table 106 on the basis of data of the object position information table 104 according to the present embodiment.

First, in step S11, the blind spot determiner 105 monitors a change to the object position information table 104.

Next, in step S12, the blind spot determiner 105 determines whether the object position information table 104 has been changed. In a case where the blind spot determiner 105 has determined here that the object position information table 104 has not been changed (NO in step S12), the process returns to step S11.

On the other hand, in a case where the blind spot determiner 105 has determined that the object position information table 104 has been changed (YES in step S12), the process proceeds to step S13, in which the blind spot determiner 105 refers to the blind spot target object table 119 to acquire a list of objects that the robot 100 judges as blind spot targets.

Next, in step S14, the blind spot determiner 105 compares the object position information table 104 and the blind spot target object table 119 with each other to identify, from among object classes stored in the object position information table 104, an object class that constitutes a blind spot target for the robot 100. In the case of the layout of FIG. 1, the blind spot determiner 105 identifies the sofa 1002, the closet 1003, and the curtain 1004 as object classes that constitute blind spot targets.

Next, in step S15, the blind spot determiner 105 stores information indicating whether an object class constitutes a blind spot target in the blind spot map table 106 in association with each region class. The blind spot determiner 105 stores position ranges and object classes stored in the object position information table 104 as position ranges and region classes in the blind spot map table 106.

Figure 14:
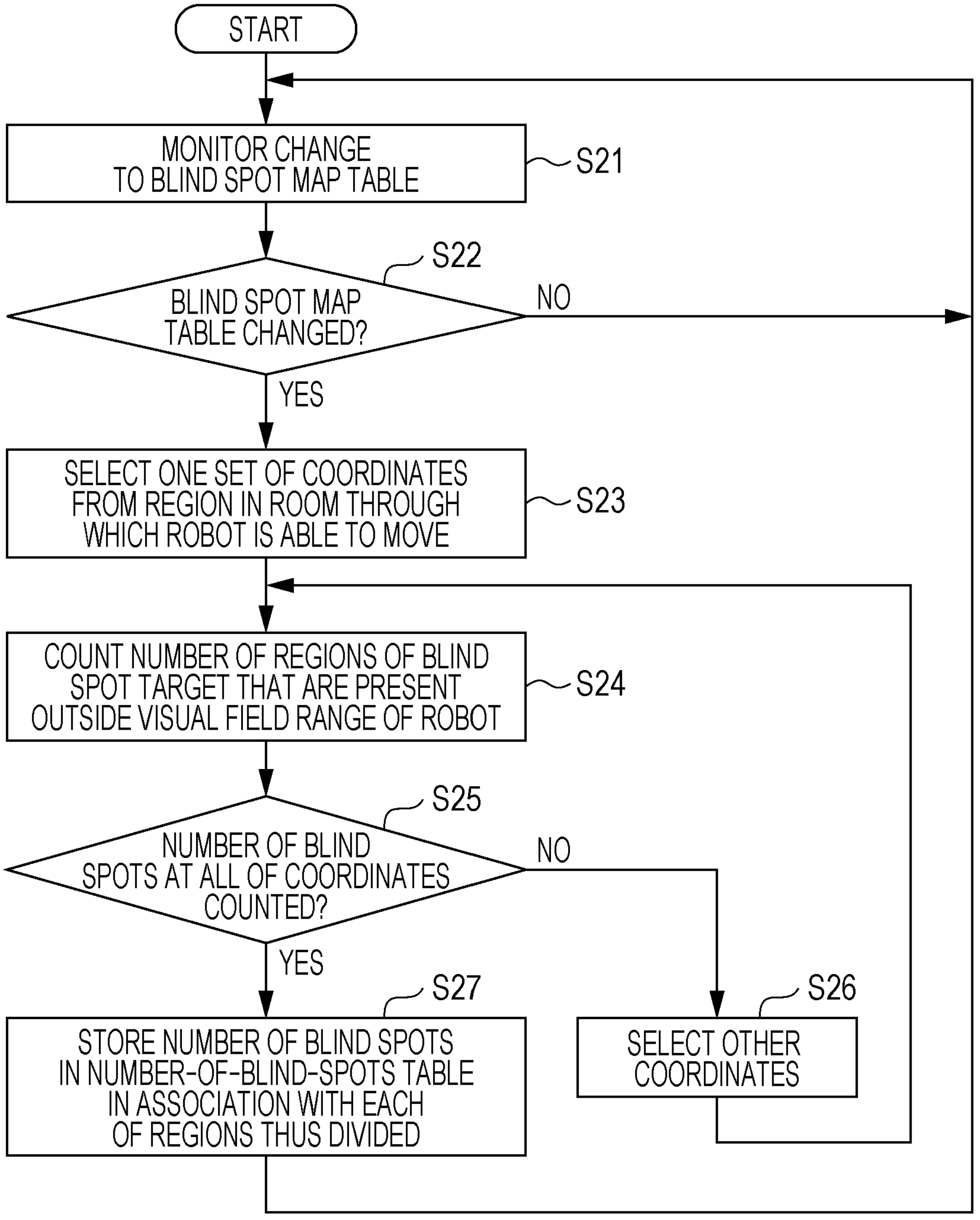
FIG. 14 is a flow chart showing an example of a process for creating and updating the number-of-blind-spots table on the basis of data of the blind spot map table according to the present embodiment.

FIG. 14 is a flow chart showing an example of the process for creating and updating the number-of-blind-spots table 108 on the basis of data of the blind spot map table 106 according to the present embodiment.

First, in step S21, the blind spot counter 107 monitors a change to the blind spot map table 106.

Next, in step S22, the blind spot counter 107 determines whether the blind spot map table 106 has been changed. In a case where the blind spot counter 107 has determined here that the blind spot map table 106 has not been changed (NO in step S22), the process returns to step S21.

On the other hand, in a case where the blind spot counter 107 has determined that the blind spot map table 106 has been changed (YES in step S22), the process proceeds to step S23, in which in order to count, at each set of coordinates of the region in the room through which the robot 100 is able to move, the number of blind-spot regions falling outside a visual field range that can be seen from a point of view of the robot 100, the blind spot counter 107 randomly selects one set of coordinates from the region in the room through which the robot 100 is able to move. For example, the blind point counter 107 selects coordinates corresponding to the position of the robot 100 shown in FIG. 8.

Next, in step S24, the blind spot counter 107 calculates the visual field range of the robot 100 at the coordinates thus selected and counts the number of regions of blind spot target that are present outside the visual field range. In the example shown in FIG. 8, the number of blind spots is 1, as the closet is the only blind spot target that is present outside the visual field range 602 of the robot 100. In so doing, it is preferable that the blind spot counter 107 make the number of blind spots at all coordinates falling within a circle of a predetermined radius centered at the coordinates at which the number of blind spots was counted equal to the number of blind spots thus counted. For example, the blind spot counter 107 may make the number of blind spots at coordinates falling within a circle having a radius of 10 cm equal to the number of blind spots at the coordinates of the center. Although it is assumed here that the number of blind spots at all coordinates falling within a circle of a predetermined radius centered at the coordinates at which the number of blind spots was counted is equal to the number of blind spots thus counted, the circle does not necessarily imply any limitation. This makes it possible to eliminate the process for counting the number of blind spots.

Next, in step S25, the blind spot counter 107 determines whether it has counted the number of blind spots at all of the coordinates of the region in the room through which the robot 100 is able to move.

In a case where the blind spot counter 107 has determined here that it has not counted the number of blind spots at all of the coordinates (NO in step S25), the process proceeds to step S26, in which the blind spot counter 107 selects, from the region in the room through which the robot 100 is able to move, other coordinates at which the number of blind spots has not been counted, and the process returns to step S24.

On the other hand, in a case where the blind spot counter 107 has determined here that it has counted the number of blind spots at all of the coordinates (YES in step S25), the process proceeds to step S27, in which the blind spot counter 107 divides the region in the room through which the robot 100 is able to move into a plurality of regions according to the number of blind spots thus counted and stores the number of blind spots in the number-of-blind-spots table 108 in association with each of the regions thus divided. That is, the blind spot counter 107 stores a number-of-blind-spots ID that identifies each of the regions thus divided, a position range indicating the range of each of the regions thus divided, the number of blind spots of each of the regions thus divided, and a blind-spot region ID for identifying the blind-spot region of each of the regions thus divided in the number-of-blind-spots table 108 in association with one another. The blind spot counter 107 divides the region in the room through which the robot 100 is able to move into regions constituted by coordinates at which the numbers of blind spots counted are equal.

In the present embodiment, in the case of discovery of coordinates at which there is no region of blind spot target outside the visual field range, i.e. in the case of discovery of coordinates at which the number of blind spots counted is 0, the blind spot counter 107 may execute step S27 without selecting other coordinates at that point of time.

Figure 16:
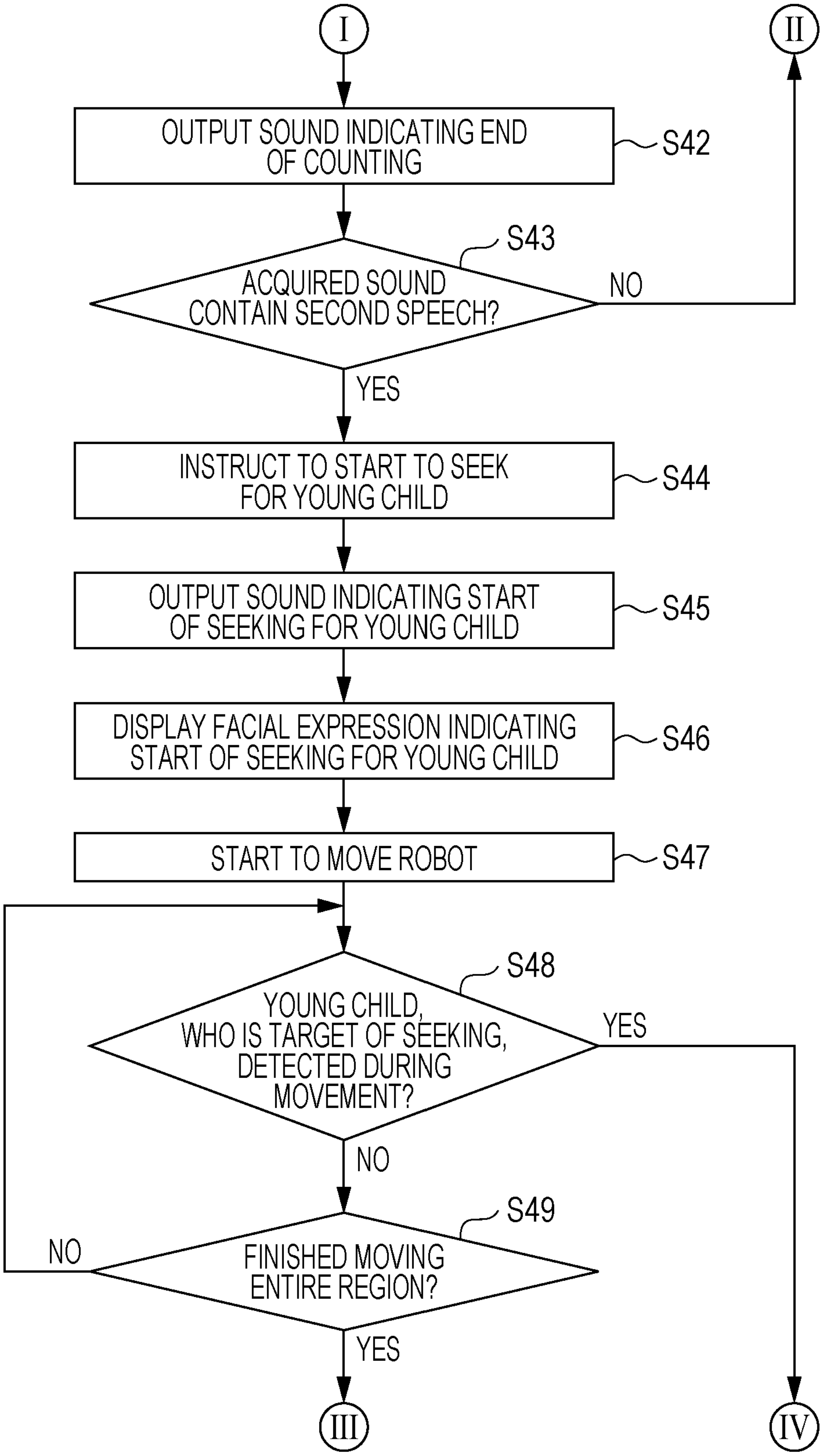
FIG. 16 is a second flow chart for explaining the example of the process by which the robot and the young child play hide-and-seek according to the present embodiment.
Figure 17:
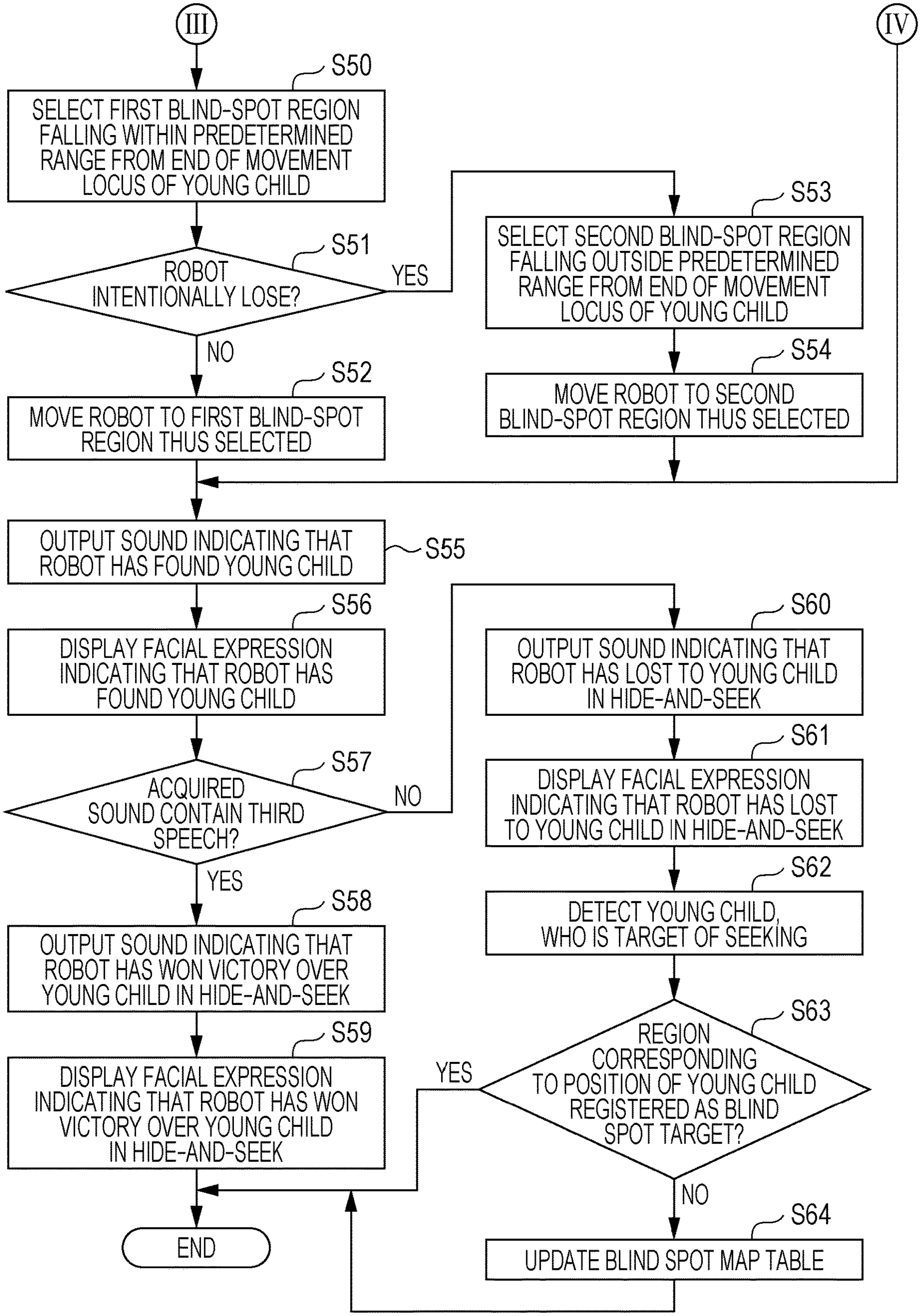
FIG. 17 is a third flow chart for explaining the example of the process by which the robot and the young child play hide-and-seek according to the present embodiment.

In the following, a process by which the robot 100 finds a young child hiding in a room is described with reference to FIGS. 15, 16, and 17.

Figure 15:
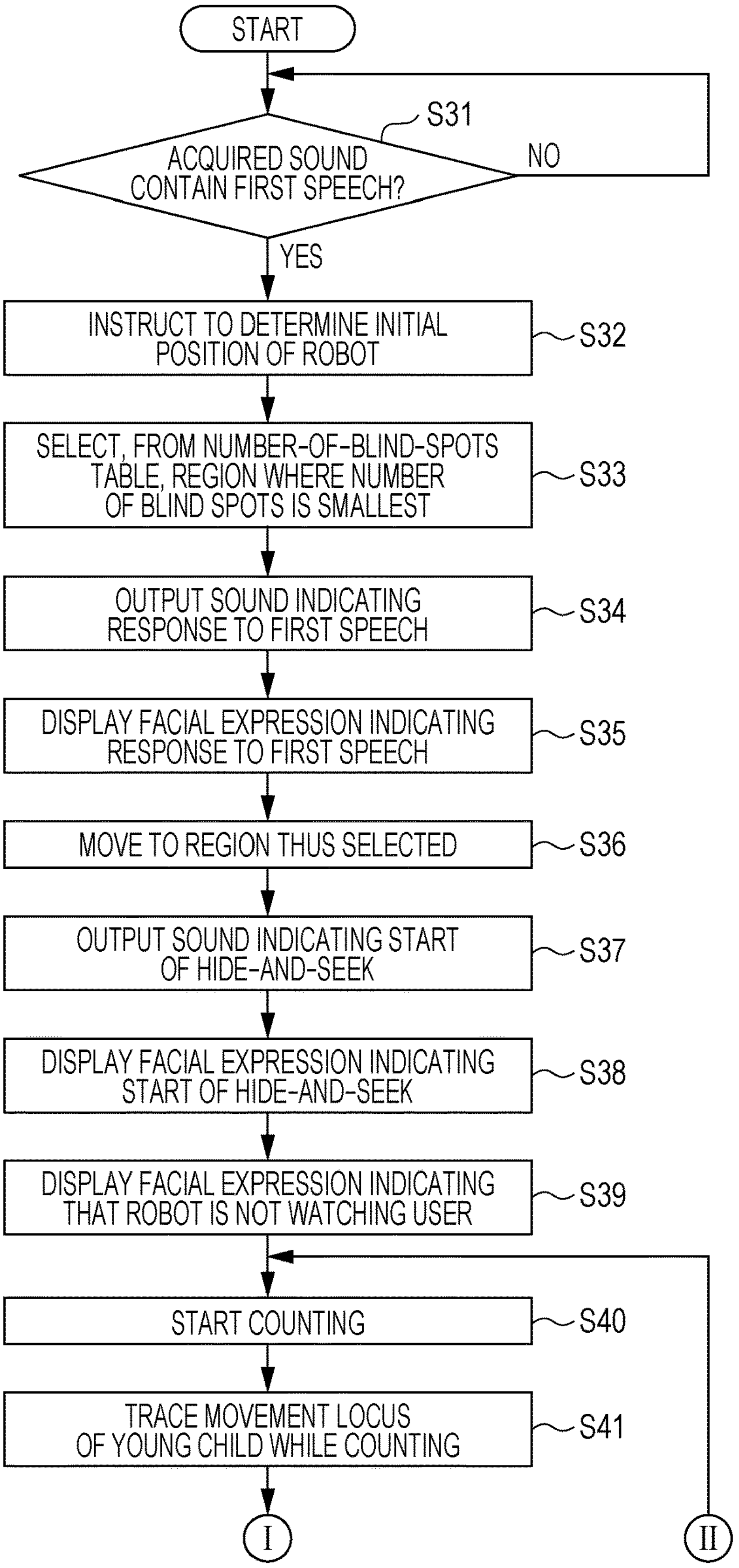
FIG. 15 is a first flow chart for explaining an example of a process by which the robot and a young child play hide-and-seek according to the present embodiment.

FIG. 15 is a first flow chart for explaining an example of the process by which the robot 100 and the young child play hide-and-seek according to the present embodiment. FIG. 16 is a second flow chart for explaining the example of the process by which the robot and the young child play hide-and-seek according to the present embodiment. FIG. 17 is a third flow chart for explaining the example of the process by which the robot and the young child play hide-and-seek according to the present embodiment.

First, in step S31, the intention interpreter 111 determines whether a sound acquired by the microphone 109 contains a first speech to the effect that hide-and-seek is started. In starting hide-and-seek, the young child uses his/her voice to announce his/her intention to want to play hide-and-seek. The intention interpreter 111 determines whether the content of a speech made by the young child is a speech indicating that hide-and-seek is started.

In a case where the intention interpreter 111 has determined that the sound thus acquired does not contain the first speech to the effect that hide-and-seek is started (NO in step S31), the determination process of step S31 is repeatedly executed.

On the other hand, in a case where the intention interpreter 111 has determined that the sound thus acquired contains the first speech to the effect that hide-and-seek is started (YES in step S31), the action executer 112 instructs the initial position determiner 113 to determine the initial position of the robot 100 in the room so that hide-and-seek is started.

Next, in step S33, the initial position determiner 113 selects, from the number-of-blind-spots table 108, a region where the number of blind spots is smallest, and determines the region thus selected as the initial position of the robot 100. In a case where there exist a plurality of regions where the number of blind spots is smallest, the initial position determiner 113 selects one region from among the plurality of regions. The initial position determiner 113 may randomly select one region from among the plurality of regions or may select, from among the plurality of regions, a region that is largest in area. There is no particular limit to a method for selecting one region from among the plurality of regions where the number of blind spots is smallest.

Since a region where the number of blind spots is smallest is thus determined as the initial position of the robot 100, the largest number of blind-spot regions can be put within the visual field of the camera, so that the locus of a movement of the young child hiding in a blind-spot region can be more accurately traced.

Next, in step S34, in order to respond to the speech made by the young child to start hide-and-seek, the sound information output controller 117 outputs a sound indicating a response to the first speech to the effect that hide-and-seek is started.

FIG. 18 is a diagram showing examples of speech text patterns that are outputted from the speaker 118 according to the present embodiment. The memory 12 of the robot 100 has stored therein a speech text pattern table shown in FIG. 18. The speech text pattern table is a table in which speech IDs 1601 for identifying from one situation to another the texts of speeches that the robot 100 makes and speech texts 1602 of speeches that the robot 100 makes in various situations are associated with each other. In response to the first speech to the effect that hide-and-seek is started, the sound information output controller 117 for example selects a speech text 1602 corresponding to a speech ID 1601 of "1" shown in FIG. 18, converts the speech text 1602 thus selected into a sound, and outputs the sound from the speaker 118. In the present embodiment, in a case where a plurality of speech texts are associated with one speech ID, the sound information output controller 117 randomly selects one speech text from among the plurality of speech texts.

Next, in step S35, in order to respond to the speech made by the young child to start hide-and-seek, the display information output controller 115 displays a facial expression indicating a response to the first speech to the effect that hide-and-seek is started.

FIG. 19 is a diagram showing examples of expression patterns that are displayed on the display 116 according to the present embodiment. The memory 12 of the robot 100 has stored therein a facial expression pattern table shown in FIG. 19. The facial expression pattern table is a table in which facial expression IDs 1701 for identifying from one situation to another facial expressions that the robot 100 displays and facial expression patterns 1702 that the robot 100 displays in various situations are associated with each other. In response to the first speech to the effect that hide-and-seek is started, the display information output controller 115 for example selects a facial expression pattern 1702 corresponding to a facial expression ID 1701 of "1" shown in FIG. 19 and displays, on the display 116, the facial expression 1702 thus selected. In the present embodiment, in a case where a plurality of facial expression patterns are associated with one facial expression ID, the display information output controller 115 randomly selects one facial expression pattern from among the plurality of facial expression patterns.

Next, in step S36, the main controller 114 controls the movement mechanism 121 to cause the robot 100 to move to the region thus selected. The main controller 114 instructs the movement mechanism 121 to cause the robot 100 to move to the region thus selected. In accordance with the instruction from the main controller 114, the movement mechanism 121 causes the robot 100 to move to the region thus selected. For example, the main controller 114 causes the robot 100 to move to the barycentric position of the region thus selected.

Next, in step S37, the sound information output controller 117 outputs, from the speaker 118, a sound (first sound) indicating the start of hide-and-seek. In outputting the sound indicating the start of hide-and-seek, the sound information output controller 117 for example selects a speech text 1602 corresponding to a speech ID 1601 of "2" shown in FIG. 18, converts the speech text 1602 thus selected into a sound, and outputs the sound from the speaker 118. In the present embodiment, in a case where a plurality of speech texts are associated with one speech ID, the sound information output controller 117 randomly selects one speech text from among the plurality of speech texts.

Next, in step S38, the display information output controller 115 displays, on the display 116, a facial expression (first display) indicating the start of hide-and-seek. In displaying the facial expression indicating the start of hide-and-seek, the display information output controller 115 for example selects a facial expression pattern 1702 corresponding to a facial expression ID 1701 of "2" shown in FIG. 19 and displays, on the display 116, the facial expression 1702 thus selected. In the present embodiment, in a case where a plurality of facial expression patterns are associated with one facial expression ID, the display information output controller 115 randomly selects one facial expression pattern from among the plurality of facial expression patterns.

After step S38, the young child starts hide-and-seek and moves through the inside of the room in order to hide.

Next, in step S39, the display information output controller 115 displays, on the display 116, a facial expression indicating that the robot 100 is not watching the young child. In displaying the facial expression indicating that the robot 100 is not watching the young child, the display information output controller 115 for example selects a facial expression pattern 1702 corresponding to a facial expression ID 1701 of "4" shown in FIG. 19 and displays, on the display 116, the facial expression 1702 thus selected. In the present embodiment, in a case where a plurality of facial expression patterns are associated with one facial expression ID, the display information output controller 115 randomly selects one facial expression pattern from among the plurality of facial expression patterns.

Next, in step S40, the main controller 114 starts to count time during which for the young child to hide in the room. Time until the end of the counting is set in advance. For example, a period of 30 seconds or 1 minute is set in advance.

Next, in step S41, while counting time, the main controller 114 uses the recognition sensor 101 and the object recognizer 103 to trace a movement locus of the young child. The main controller 114 treats the position of the young child in the room at the start of the counting as a starting point and traces the movement locus of the young child from the starting point. The main controller 114 stores, in the memory 12, the movement locus of the young child thus traced.

Next, in step S42, the sound information output controller 117 outputs, from the speaker 118, a sound indicating the end of the counting. In outputting the sound indicating the end of the counting, the sound information output controller 117 for example selects a speech text 1602 corresponding to a speech ID 1601 of "3" shown in FIG. 18, converts the speech text 1602 thus selected into a sound, and outputs the sound from the speaker 118. In the present embodiment, in a case where a plurality of speech texts are associated with one speech ID, the sound information output controller 117 randomly selects one speech text from among the plurality of speech texts.

Next, in step S43, the intention interpreter 111 determines whether a sound acquired by the microphone 109 contains a second speech indicating that the young child has finished hiding.

In a case where the intention interpreter 111 has determined here that the sound thus acquired does not contain the second speech indicating that the young child has finished hiding (NO in step S43), the process returns to step S40. In a case where the sound thus acquired does not contain the second speech indicating that the young child has finished hiding, the intention interpreter 111 may determine whether the sound thus acquired contains a speech indicating a postponement of the start of seeking. In a case where the intention interpreter 111 has determined that the sound thus acquired contains a speech indicating a postponement of the start of seeking, the process may return to step S40. In a case where the intention interpreter 111 has determined that the sound thus acquired does not contain a speech indicating a postponement of the start of seeking, the process may proceed to step S44, as it is estimated that the young child has finished hiding.

On the other hand, in a case where the intention interpreter 111 has determined here that the sound thus acquired contains the second speech indicating that the young child has finished hiding (YES in step S43), the process proceeds to step S44, in which the action executer 112 instructs the main controller 114 to start to seek for the young child.

Next, in step S45, the sound information output controller 117 outputs, from the speaker 118, a sound indicating the start of seeking for the young child. In outputting the sound indicating the start of seeking for the young child, the sound information output controller 117 for example selects a speech text 1602 corresponding to a speech ID 1601 of "4" shown in FIG. 18, converts the speech text 1602 thus selected into a sound, and outputs the sound from the speaker 118. In the present embodiment, in a case where a plurality of speech texts are associated with one speech ID, the sound information output controller 117 randomly selects one speech text from among the plurality of speech texts.

Next, in step S46, the display information output controller 115 displays, on the display 116, a facial expression indicating the start of seeking for the young child. In displaying the facial expression indicating the start of seeking for the young child, the display information output controller 115 for example selects a facial expression pattern 1702 corresponding to a facial expression ID 1701 of "1" shown in FIG. 19 and displays, on the display 116, the facial expression 1702 thus selected. In the present embodiment, in a case where a plurality of facial expression patterns are associated with one facial expression ID, the display information output controller 115 randomly selects one facial expression pattern from among the plurality of facial expression patterns.

Next, in step S47, on receiving the instruction to start to seek for the young child, the main controller 114 controls the movement mechanism 121 to cause the robot 100 to start to move. At this point in time, the main controller 114 controls the movement mechanism 121 to cause the robot 100 to move through the entire region in the room through which the robot 100 is able to move. In so doing, the main controller 114 may cause the robot 100 to randomly move to search everywhere in the entire room or may move while storing a movement locus of the robot 100 so as to reduce the number of regions through which the robot 100 has not moved. There is no particular limit to how to move. Further, the main controller 114 seeks for the young child during a movement. At this point in time, the main controller 114 uses the object recognition sensor 101 and the object recognizer 103 to seek for the young child so as to detect the face of the young child stored in advance. The face of the young child may be stored at the start of hide-and-seek such as a period of time between step S39 and step S40, or may be user-registered in advance.

Next, in step S48, the main controller 114 determines whether the young child, who is the target of seeking, has been detected by the object recognition sensor 101 and the object recognizer 103 while the robot 100 is moving. In a case where the main controller 114 has determined that the young child, who is the target of seeking, has been detected during the movement (YES in step S48), the process proceeds to step S55.

On the other hand, in a case where the main controller 114 has determined that the young child, who is the target of seeking, has not been detected during the movement (NO in step S48), the process proceeds to step S49, in which the main controller 114 determines whether the robot 100 has finished moving through the entire region in the room through which the robot 100 is able to move. In a case where the main controller 114 has determined here that the robot 100 has not finished moving through the entire region in the room through which the robot 100 is able to move (NO in step S49), the process returns to step S48.

On the other hand, in a case where the main controller 114 has determined here that the robot 100 has finished moving through the entire region in the room through which the robot 100 is able to move (YES in step S49), the process proceeds to step S50, in which by utilizing the movement locus of the young child traced, the main controller 114 selects, from the blind spot map table 106, a first blind-spot region that is present within a predetermined range from an end of the movement locus of the young child. In a case where a plurality of blind-spot regions are present within the predetermined range from the end of the movement locus, the main controller 114 selects one blind-spot region from among the plurality of blind-spot regions falling within the predetermined range. At this point in time, the main controller 114 may randomly select one blind-spot region from among the plurality of blind-spot regions falling within the predetermined range or may select one blind-spot region that is closest to the end from among the plurality of blind-spot regions falling within the predetermined range.

Next, in step S51, the main controller 114 determines whether the robot 100 intentionally loses. At this point in time, the main controller 114 randomly determines whether the robot 100 intentionally loses. A probability of intentional losing is designated in advance for the robot 100.

In a case where the main controller 114 has determined that the robot 100 does not intentionally lose (NO in step S51), the process proceeds to step S52, in which the main controller 114 controls the movement mechanism 121 to cause the robot 100 to move to the first blind-spot region thus selected.

On the other hand, in a case where the main controller 114 has determined that the robot 100 intentionally loses (YES in step S51), the process proceeds to step S53, in which by utilizing the movement locus of the young child traced, the main controller 114 selects, from the blind spot map table 106, a second blind-spot region that is present outside the predetermined range from the end of the movement locus of the young child. In a case where a plurality of blind-spot regions are present outside the predetermined range from the end of the movement locus of the young child, the main controller 114 selects one blind-spot region from among the plurality of blind-spot regions falling outside the predetermined range. At this point in time, the main controller 114 may randomly select one blind-spot region from among the plurality of blind-spot regions falling outside the predetermined range or may select one blind-spot region that is farthest from the end from among the plurality of blind-spot regions falling outside the predetermined range.

Next, in step S54, the main controller 114 controls the movement mechanism 121 to cause the robot 100 to move to the second blind-spot region thus selected.

Next, in step S55, the sound information output controller 117 outputs, from the speaker 118, a sound (second sound) indicating that the robot 100 has found the young child. In outputting the sound indicating that the robot 100 has found the young child, the sound information output controller 117 for example selects a speech text 1602 corresponding to a speech ID 1601 of "5" shown in FIG. 18, converts the speech text 1602 thus selected into a sound, and outputs the sound from the speaker 118. In the present embodiment, in a case where a plurality of speech texts are associated with one speech ID, the sound information output controller 117 randomly selects one speech text from among the plurality of speech texts.

Next, in step S56, the display information output controller 115 displays, on the display 116, a display (second display) indicating that the robot 100 has found the young child. In displaying the facial expression indicating that the robot 100 has found the young child, the display information output controller 115 for example selects a facial expression pattern 1702 corresponding to a facial expression ID 1701 of "2" shown in FIG. 19 and displays, on the display 116, the facial expression 1702 thus selected. In the present embodiment, in a case where a plurality of facial expression patterns are associated with one facial expression ID, the display information output controller 115 randomly selects one facial expression pattern from among the plurality of facial expression patterns.

In a case where steps S55 and S56 have been executed after the main controller 114 has determined in step S48 that the young child, who is the target of seeking, has been detected while the robot 100 is moving, the hide-and-seek process may be ended, as it is clear that the robot 100 has won.

Next, in step S57, the intention interpreter 111 determines whether a sound acquired by the microphone 109 contains a third sound indicating an admission of defeat by the young child, who is the target of seeking.

In a case where the intention interpreter 111 has determined that the sound thus acquired contains the third speech indicating an admission of defeat by the young child, who is the target of seeking (YES in step S57), the process proceeds to step S58, in which the sound information output controller 117 outputs, from the speaker 118, a sound (third sound) indicating that the robot 100 has won a victory over the young child in hide-and-seek. In outputting the sound indicating that the robot 100 has won a victory over the young child in hide-and-seek, the sound information output controller 117 for example selects a speech text 1602 corresponding to a speech ID 1601 of "6" shown in FIG. 18, converts the speech text 1602 thus selected into a sound, and outputs the sound from the speaker 118. In the present embodiment, in a case where a plurality of speech texts are associated with one speech ID, the sound information output controller 117 randomly selects one speech text from among the plurality of speech texts.

Next, in step S59, the display information output controller 115 displays, on the display 116, a facial expression (third display) indicating that the robot 100 has won a victory over the young child in hide-and-seek. In displaying the facial expression indicating that the robot 100 has won a victory over the young child in hide-and-seek, the display information output controller 115 for example selects a facial expression pattern 1702 corresponding to a facial expression ID 1701 of "2" shown in FIG. 19 and displays, on the display 116, the facial expression 1702 thus selected. In the present embodiment, in a case where a plurality of facial expression patterns are associated with one facial expression ID, the display information output controller 115 randomly selects one facial expression pattern from among the plurality of facial expression patterns.

On the other hand, in a case where the intention interpreter 111 has determined that the sound thus acquired does not contain the third speech indicating an admission of defeat by the young child, who is the target of seeking (NO in step S57), the process proceeds to step S60, in which the sound information output controller 117 outputs, from the speaker 118, a sound (fourth sound) indicating that the robot 100 has lost to the young child in hide-and-seek. In outputting the sound indicating that the robot 100 has lost to the young child in hide-and-seek, the sound information output controller 117 for example selects a speech text 1602 corresponding to a speech ID 1601 of "7" shown in FIG. 18, converts the speech text 1602 thus selected into a sound, and outputs the sound from the speaker 118. In the present embodiment, in a case where a plurality of speech texts are associated with one speech ID, the sound information output controller 117 randomly selects one speech text from among the plurality of speech texts.

Next, in step S61, the display information output controller 115 displays, on the display 116, a facial expression (fourth display) indicating that the robot 100 has lost to the young child in hide-and-seek. In displaying the facial expression indicating that the robot 100 has lost to the young child in hide-and-seek, the display information output controller 115 for example selects a facial expression pattern 1702 corresponding to a facial expression ID 1701 of "3" shown in FIG. 19 and displays, on the display 116, the facial expression 1702 thus selected. In the present embodiment, in a case where a plurality of facial expression patterns are associated with one facial expression ID, the display information output controller 115 randomly selects one facial expression pattern from among the plurality of facial expression patterns.

Thus, after the movement locus of the young child has been traced by the object recognition sensor 101 when the predetermined number has been counted and the young child is hiding in the first region where the number of blind spots is smallest in the space, a movement to the entire region through which the robot 100 is able to move is started, and in a case where the object recognition sensor 101 has not detected the young child by the time the robot 100 finishes moving through the entire region, the first blind-spot region falling within the predetermined range from the end of the movement locus of the young child is selected and the robot 100 is moved to the first blind-spot region. Note here that the first blind spot can be said to be a blind spot in which the young child is highly likely to have hidden, as the first blind spot falls within the predetermined range from the end of the movement locus of the young child. This makes it possible to identify a blind spot in which the young child is highly likely to be hiding and that cannot been seen from the robot 100.

Next, in step S62, the main controller 114 uses the object recognition sensor 101 and the object recognizer 103 to detect the young child, who is the target of seeking.

Next, in step S63, the main controller 114 determines whether a region corresponding to the position of the young child, who is the target of seeking, thus detected is registered as a blind spot target in the blind spot map table 106. In a case where the main controller 114 has determined that the region corresponding to the position of the young child, who is the target of seeking, is registered as a blind spot target in the blind spot map table 106 (YES in step S63), the hide-and-seek process is ended.

On the other hand, in a case where the main controller 114 has determined that the region corresponding to the position of the young child, who is the target of seeking, is not registered as a blind spot target in the blind spot map table 106 (NO in step S63), the process proceeds to step S64, in which the main controller 114 registers the region corresponding to the position of detection of the young child as a blind spot target in the blind spot map table 106 and updates the blind spot map table 106.

For example, in the blind spot map table 106 of FIG. 7, the door is not registered as a blind spot target; therefore, in a case where the young child is hiding in the gap between the door and the wall of FIG. 1, the robot 100 cannot identify the position in which the young child is hiding. However, once the young child is detected in a gap 1001 between the door and the wall after the robot 100 has lost, a region corresponding to the position of the door where the young child has been detected is registered as a blind spot target in the blind spot map table 106 and the blind spot map table 106 is updated. This allows the robot 100 to select the door as a blind-spot region in playing a next round of hide-and-seek and identify the gap 1001 between the door and the wall as a position in which the young child is hiding.

In the present disclosure, all or a part of any of unit, device, part or portion, or any of functional blocks in the illustrated block diagrams may be implemented as one or more of electronic circuits including, but not limited to, a semiconductor device, a semiconductor integrated circuit (IC) or an LSI. The LSI or IC can be integrated into one chip, or also can be a combination of plural chips. For example, functional blocks other than a memory may be integrated into one chip. The name used here is LSI or IC, but it may also be called system LSI, VLSI (very large scale integration), or ULSI (ultra large scale integration) depending on the degree of integration. A Field Programmable Gate Array (FPGA) that can be programmed after manufacturing an LSI or a reconfigurable logic device that allows reconfiguration of the connection or setup of circuit cells inside the LSI can be used for the same purpose.

Further, it is also possible that all or a part of the functions or operations of the unit, device, part or portion are implemented by executing software. In such a case, the software is recorded on one or more non-transitory recording media such as a ROM, an optical disk or a hard disk drive, and when the software is executed by a processor, the software causes the processor together with peripheral devices to execute the functions specified in the software. A system or apparatus may include such one or more non-transitory recording media on which the software is recorded and a processor together with necessary hardware devices such as an interface.

An apparatus, a method, a recording medium storing a program, and a robot according to the present disclosure are useful as an apparatus, a method, a recording medium storing a program, and a robot that make it possible to identify a blind spot in which a user is highly likely to be hiding and that cannot be seen from the apparatus.

What is claimed is:

1. A robot for interacting with a user while two-dimensionally moving through a predetermined space, comprising:

a movement mechanism configured to physically move the robot across the predetermined space;

a sensor that detects an electromagnetic wave or a sound wave reflected by an object;

a microphone that acquires a sound of an area around the robot;

a speaker;

a processor; and a memory, wherein, in a case where the microphone acquires a first speech indicating starting of a game of hide-and-seek with the robot, the processor selects, with reference to a first table stored in the memory, a first region of the predetermined space where a number of blind spots is smallest in the predetermined space, the first table associating a plurality of regions included in the predetermined space and numbers of blind spots present in the plurality of regions with each other, the processor controls the movement mechanism to cause the robot to physically move to the first region, the processor causes the speaker to output a first sound, the processor counts a predetermined number, when counting the predetermined number, the processor causes the sensor to trace a movement locus of the user while the user is detectable by the sensor from a stationary position of the robot and identify an end point of the movement locus of the user that is detected by the sensor, in a case where the processor has finished counting the predetermined number, the processor causes the speaker to output a sound indicating that the processor has finished counting the predetermined number, and the processor controls the movement mechanism to cause the robot to physically move through an entire region in the predetermined space through which the robot is able to move, in a case where the sensor has not detected the user by a time the robot finishes moving through the entire region, the processor selects, with reference to a second table stored in the memory, a first blind spot falling within a predetermined range from the end point of the traced movement locus of the user, the second table associating a blind spot in the predetermined space and a position of the blind spot with each other, the processor determines whether the robot is to intentionally lose in the game of hide-and-seek or not to intentionally lose in the game of hide-and-seek, in a case where the processor has determined that the robot is not to intentionally lose in the game of hide-and-seek, the processor controls the movement mechanism to cause the robot to physically move to the first blind spot and causes the speaker to output a second sound, in a case where the microphone acquires a second speech indicating an admission of defeat in the game of hide-and-seek by the user, the processor causes the speaker to output a third sound, in a case where the microphone does not acquire the second speech, the processor causes the speaker to output a fourth sound, in a case where the processor has determined that the robot is to intentionally lose, the processor selects, with reference to the second table, a second blind spot falling outside the predetermined range, the processor controls the movement mechanism to cause the robot to physically move to the second blind spot, and the processor causes the speaker to output the second sound, in a case where the microphone acquires the second speech, the processor causes the speaker to output the third sound, and in a case where the microphone does not acquire the second speech, the processor causes the speaker to output the fourth sound.

2. The robot according to claim 1, wherein the sensor includes at least one of a camera, an infrared sensor, an ultrasonic sensor, and a laser sensor.

3. The robot according to claim 1, wherein, in a case where the microphone does not acquire the second speech and where the sensor detects that the user is hiding in a third blind spot that is not included in the second table, the processor stores the third blind spot and a position of the third blind spot in the second table in association with each other.

4. The robot according to claim 1, wherein, in a case where the sensor detects the user by the time the robot finishes moving through the entire region, the processor causes the speaker to output the third sound.

5. The robot according to claim 1, further comprising a display, wherein, in causing the first sound to be outputted, the processor causes the display to display a first display corresponding to the first sound, in causing the second sound to be outputted, the processor causes the display to display a second display corresponding to the second sound, in causing the third sound to be outputted, the processor causes the display to display a third display corresponding to the third sound, and in causing the fourth sound to be outputted, the processor causes the display to display a fourth display corresponding to the fourth sound.

6. The robot according to claim 5, wherein the display displays a facial expression of the robot, the facial expression including two eyes and a mouth, the first sound indicates a start of the game of hide-and-seek, and the first display indicates a smile.

7. The robot according to claim 5, wherein the display displays a facial expression of the robot, the facial expression including two eyes and a mouth, the second sound indicates that the robot has found the user, and the second display indicates a smile.

8. The robot according to claim 5, wherein the display displays a facial expression of the robot, the facial expression including two eyes and a mouth, the third sound indicates that the robot has won a victory over the user in the game of hide-and-seek, and the third display indicates a smile.

9. The robot according to claim 5, wherein the display displays a facial expression of the robot, the facial expression including two eyes and a mouth, the fourth sound indicates that the robot has lost to the user in the game of hide-and-seek, and the fourth display indicates a facial expression of sorrow.

10. The robot according to claim 1, wherein, in a case where the microphone acquires a third speech indicating that the user has finished hiding, the processor controls the movement mechanism to cause the robot to physically move through the entire region in the predetermined space.

11. The robot according to claim 1, further comprising:

a main housing that is a sphere from which a first side part and a second side part opposite to the first side part have been cut;

a first spherical crown corresponding to the first side part; and a second spherical crown corresponding to the second side part.

12. A method by which a robot interacts with a user while two-dimensionally and physically moving through a predetermined space, the method comprising:

in a case where a microphone acquires a first speech indicating starting of a game of hide-and-seek with the robot, selecting, with reference to a first table stored in the memory, a first region of the predetermined space where a number of blind spots is smallest in the predetermined space, the first table associating a plurality of regions included in the predetermined space and numbers of blind spots present in the plurality of regions with each other;

controlling a movement mechanism to cause the robot to physically move to the first region;

causing the speaker to output a first sound;

counting a predetermined number;

when counting the predetermined number, causing a sensor that detects an electromagnetic wave or sound wave reflected by an object to trace a movement locus of the user while the user is detectable by the sensor from a stationary position of the robot and identify an end point of the movement locus of the user that is detected by the sensor;

in a case where the robot has finished counting the predetermined number, causing the speaker to output a sound indicating that the robot has finished counting the predetermined number and controlling the movement mechanism to cause the robot to physically move through an entire region in the predetermined space through which the robot is able to move;

in a case where the sensor has not detected the user by a time the robot finishes moving through the entire region, selecting, with reference to a second table stored in the memory, a first blind spot falling within a predetermined range from the end point of the traced movement locus of the user, the second table associating a blind spot in the predetermined space and a position of the blind spot with each other;

determining whether the robot is to intentionally lose in the game of hide-and-seek or not to intentionally lose in the game of hide-and-seek;

in a case where the robot has determined that the robot is not to intentionally lose in the game of hide-and-seek, controlling the movement mechanism to cause the robot to physically move to the first blind spot and cause the speaker to output a second sound;

in a case where the microphone acquires a second speech indicating an admission of defeat in the game of hide-and-seek by the user, causing the speaker to output a third sound;

in a case where the microphone does not acquire the second speech, causing the speaker to output a fourth sound;

in a case where the robot has determined that the robot is to intentionally lose, selecting, with reference to the second table, a second blind spot falling outside the predetermined range, controlling the movement mechanism to cause the robot to physically move to the second blind spot, and causing the speaker to output the second sound;

in a case where the microphone acquires including the second speech, causing the speaker to output the third sound; and in a case where the microphone does not acquire the second speech, causing the speaker to output the fourth sound.

13. A non-transitory computer-readable recording medium storing a program for interacting with a user while two-dimensionally moving through a predetermined space, the program causing a processor of a robot for interacting with the user to execute a process comprising:

in a case where a microphone acquires a first speech indicating starting of a game of hide-and-seek with the robot, selecting, with reference to a first table stored in the memory, a first region of the predetermined space where a number of blind spots is smallest in the predetermined space, the first table associating a plurality of regions included in the predetermined space and numbers of blind spots present in the plurality of regions with each other;

controlling a movement mechanism to cause the robot to physically move to the first region;

causing the speaker to output a first sound;

counting a predetermined number;

when counting the predetermined number, causing a sensor that detects an electromagnetic wave or sound wave reflected by an object to trace a movement locus of the user while the user is detectable by the sensor from a stationary position of the robot and identify an end point of the movement locus of the user that is detected by the sensor;

in a case where the processor has finished counting the predetermined number, causing the speaker to output a sound indicating that the robot has finished counting the predetermined number, and controlling the movement mechanism to cause the robot to physically move through an entire region in the predetermined space through which the robot is able to move;

in a case where the sensor has not detected the user by a time the robot finishes moving through the entire region, selecting, with reference to a second table stored in the memory, a first blind spot falling within a predetermined range from the end point of the traced movement locus of the user, the second table associating a blind spot in the predetermined space and a position of the blind spot with each other;

determining whether the robot is to intentionally lose in the game of hide-and-seek or not to intentionally lose in the game of hide-and-seek;

in a case where the processor has determined that the robot is not to intentionally lose in the game of hide-and-seek, controlling the movement mechanism to cause the robot to physically move to the first blind spot and causing the speaker to output a second sound;

in a case where the microphone acquires a second speech indicating an admission of defeat in the game of hide-and-seek by the user, causing the speaker to output a third sound;

in a case where the microphone does not acquire the second speech, causing the speaker to output a fourth sound, in a case where the processor has determined that the robot is to intentionally lose, selecting, with reference to the second table, a second blind spot falling outside the predetermined range, controlling the movement mechanism to cause the robot to physically move to the second blind spot, and causing the speaker to output the second sound, in a case where the microphone acquires including the second speech, causing the speaker to output the third sound; and in a case where the microphone does not acquire the second speech, causing the speaker to output the fourth sound.

* * * * *